(12) United States Patent
Zhu et al.

(10) Patent No.: US 11,571,774 B2
(45) Date of Patent: Feb. 7, 2023

(54) INTELLIGENT PLATE PARTS MACHINING PRODUCTION LINE COMBINING UNIVERSAL AND SPECIAL EQUIPMENT

(71) Applicants: JIANGSU UNIVERSITY OF SCIENCE AND TECHNOLOGY, Zhenjiang (CN); JIANGSU TIEKE NEW MATERIAL CO., LTD., Zhenjiang (CN)

(72) Inventors: Chengshun Zhu, Zhenjiang (CN); Hui Zhang, Zhenjiang (CN); Yujun Huang, Zhenjiang (CN); Bincheng Li, Zhenjiang (CN); Kaihang Yang, Zhenjiang (CN); Lei Ding, Zhenjiang (CN)

(73) Assignees: JIANGSU UNIVERSITY OF SCIENCE AND TECHNOLOGY, Zhenjiang (CN); JIANGSU TIEKE NEW MATERIAL CO., LTD., Zhenjiang (CN)

( * ) Notice: Subject to any disclaimer, the term of this patent is extended or adjusted under 35 U.S.C. 154(b) by 0 days.

(21) Appl. No.: 17/774,794

(22) PCT Filed: Sep. 7, 2020

(86) PCT No.: PCT/CN2020/113737
§ 371 (c)(1),
(2) Date: May 5, 2022

(87) PCT Pub. No.: WO2021/088500
PCT Pub. Date: May 14, 2021

(65) Prior Publication Data
US 2022/0347810 A1    Nov. 3, 2022

(30) Foreign Application Priority Data
Nov. 8, 2019   (CN) .......................... 201911087853.2

(51) Int. Cl.
B23Q 7/04          (2006.01)
B23P 23/06        (2006.01)
(Continued)

(52) U.S. Cl.
CPC ................ *B23Q 7/04* (2013.01); *B23P 23/06* (2013.01); *B23Q 7/005* (2013.01); *B23Q 7/103* (2013.01);
(Continued)

(58) Field of Classification Search
CPC ... Y10T 29/5124; Y10T 29/5196; B23Q 7/04; B23Q 7/041; B23Q 7/10; B23Q 7/103;
(Continued)

(56) References Cited

U.S. PATENT DOCUMENTS 4,655,664 A * 4/1987 Feichtl ..................... B23Q 7/10
                                                                    414/928
4,946,021 A * 8/1990 Murphy ................. B23Q 1/525
                                                                    29/33 P
(Continued)

FOREIGN PATENT DOCUMENTS

CN    202952122 U    5/2013
CN    108481092 A *  9/2018    ............. B23Q 41/02
(Continued)

OTHER PUBLICATIONS

EPO Machine Translation of CN110281012A—"Truss Type Forging Flange Automatic Machining Production Line", Bao et al., Sep. 27, 2019.*
(Continued)

*Primary Examiner* — Erica E Cadugan
*Assistant Examiner* — Michael Vitale
(74) *Attorney, Agent, or Firm* — Hauptman Ham, LLP

(57) ABSTRACT

An intelligent plate parts machining production line combining universal equipment and special equipment. Four
(Continued)

special machining tools are located on first to fourth stations, respectively, and a universal machining tool is located on a fifth station. The stations are sequential from an automatic feeding device. Truss conveying devices are behind the first to fourth stations, and four mechanical arms are on the truss conveying devices. A four-axis manipulator is between the fourth and fifth stations for transferring materials between the two stations and discharging finished products. Industrial cameras are on the second-station mechanical arm and the four-axis manipulator. Waste boxes are between the first and second stations and between the fourth and fifth stations. A discharging box is on the front side of the fifth station. A scrap conveying mechanism is below the production line. Flexible clamps and sliding rail cylinders are used, so that the production line is flexible.

10 Claims, 14 Drawing Sheets

(51) Int. Cl.
  *B23Q 11/00* (2006.01)
  *B23Q 7/10* (2006.01)
  *B23Q 7/00* (2006.01)
(52) U.S. Cl.
  CPC ....... *B23Q 11/0067* (2013.01); *Y10T 29/5124* (2015.01); *Y10T 29/5196* (2015.01)
(58) Field of Classification Search
  CPC . B23Q 7/14; B23Q 41/02; B23P 23/02; B23P 23/04; B23P 23/06

USPC .................................................. 29/33 P, 563
  See application file for complete search history.

(56) References Cited

U.S. PATENT DOCUMENTS

| | | | | |
|---|---|---|---|---|
| 5,368,539 | A | * | 11/1994 | Mills ...................... B23Q 41/00 408/1 R |
| 7,334,314 | B2 | * | 2/2008 | Nussbaum ............. B23Q 1/012 414/222.01 |
| 8,646,170 | B2 | * | 2/2014 | Weigl ................ H01L 21/67721 29/729 |
| 10,840,116 | B2 | * | 11/2020 | Iizuka ................ B24B 27/0069 |
| 2006/0048359 | A1 | * | 3/2006 | Sammartin .............. B23Q 1/66 29/26 A |

FOREIGN PATENT DOCUMENTS

| | | | | |
|---|---|---|---|---|
| CN | 109571041 | A | * 4/2019 | ............. B23P 23/06 |
| CN | 109623926 | A | 4/2019 | |
| CN | 110281012 | A | 9/2019 | |
| CN | 110303345 | A | * 10/2019 | ............. B23P 23/06 |
| CN | 110773779 | A | 2/2020 | |
| DE | 2043894 | A1 | 3/1972 | |
| JP | H0741522 | B2 | * 5/1995 | ......... Y10T 29/5196 |

OTHER PUBLICATIONS

International Search Report issued in corresponding International Application No. PCT/CN2020/113737, dated Dec. 9, 2020; 7 pgs.
Written Opinion issued in corresponding International Application No. PCT/CN2020/113737, dated Dec. 9, 2020; 8 pgs.

* cited by examiner

INTELLIGENT PLATE PARTS MACHINING PRODUCTION LINE COMBINING UNIVERSAL AND SPECIAL EQUIPMENT

RELATED APPLICATIONS

The present application is a U.S. National Phase of International Application Number PCT/CN2020/113737 filed Sep. 7, 2020 and claims priority to Chinese Application Number 2019110878532 filed Nov. 8, 2019.

TECHNICAL FIELD

The present invention relates to a highly efficient automated production line, more particularly relates to an intelligent plate parts machining production line combining universal equipment and special equipment, belongs to the technical field of mechanical processing equipment, and is especially suitable for an assembly line production mode of plate and frame parts that requires control of manufacturing costs.

BACKGROUND

A flexible machining production line is an inevitable way to transform a conventional manufacturing industry to automated production, and is an inevitable choice for manufacturing enterprises to improve production efficiency and reduce labor costs. Advantages of the flexible production line can be better applied for machining of plate and frame parts with large output and simple structures. However, in the pursuit of automated and flexible production, enterprises often fail to achieve expected results due to limitations of various factors. The problem is: the manufacturing costs of the flexible production line is extremely high, far exceeding the expected return; the production line cannot truly achieve flexibility and cannot adapt to product and market changes; and machining efficiency of the production line is low and cannot meet output requirements.

Currently, in the machining of plate and frame parts, most enterprises still tend to use conventional machine tools with simple structures, and clamping and conveying of parts depend on workers or assembly lines. Such a production method has low equipment costs and easy maintenance, but a low level of automation, high dependence on workers, and high labor costs. In addition, a large quantity of machine tools is difficult to manage in a centralized manner, and the production efficiency is limited by factors of workers. Urgently seeking production methods to reduce labor costs and improve the level of automation, some enterprises blindly choose the common flexible production line layout of manipulators combined with general machining equipment on the market, rigidly combining the machining process of the plate and frame parts and the production lines together, resulting in many problems. The plate and frame parts have small costs, low machining requirements, and mass production. The costs of the flexible production line using multiple general machining equipment have exceeded the value return of the plate and frame parts, and the general machining equipment cannot reach the machining efficiency of dedicated machine tools, and thus cannot meet a product output requirement. In addition, during milling of upper and lower surfaces of the plate parts, defective products that are not milled are easily produced due to clamping deformation, vibration, and other factors. Currently, the defective products are mainly sorted manually, which greatly wastes resources and consumes time and labor.

In summary, based on the control of manufacturing costs, it has become an urgent technical problem to be resolved in the plate and frame parts manufacturing industry to design a flexible production line suitable for production and machining of plate and frame parts, to improve production efficiency and automation levels, reduce labor costs, and achieve intelligent sorting of defective products. This has great practical significance for plate and frame parts manufacturers.

SUMMARY

The objective of the present invention is to design a flexible production line that can produce four types of plate and frame parts shown in FIG. 1, to improve production efficiency and an automation level in a machining process, and reduce labor costs. Through the selection of machine type and the design of clamp, manufacturing costs are to be reduced while machining efficiency is ensured, and intelligent sorting of defective products plate parts is to be achieved.

In order to achieve the foregoing objective, the present invention provides the following technical solutions: an intelligent plate parts machining production line combining universal and special equipment, including a first-station large surface milling machine, a second-station side milling machine, a third-station side chamfering milling machine, a fourth-station large surface milling machine, a fifth-station computer numerical control universal machining center, an automatic feeding device, a truss conveying device, a four-axis two jaw manipulator, a waste box, a discharging box, a scrap conveying mechanism, and a controller.

The production line is arranged in a shape of a square, the automatic feeding device includes two feeding bodies, longitudinally arranged and placed at the beginning of the production line, a scrap outlet of the scrap conveying mechanism is placed at the end of the production line, and the first-station large surface milling machine, the second-station side milling machine, the third-station side chamfering milling machine, the fourth-station large surface milling machine, and the fifth-station computer numerical control universal machining center are placed in a linear shape in sequence horizontally on a front side between the beginning and the end; the truss conveying device is arranged in parallel on a rear side with respect to the front side, and the truss conveying device is correspondingly provided with a first-station mechanical arm, a second-station mechanical arm, a third-station mechanical arm, and a fourth-station mechanical arm in sequence; the four-axis two-jaw manipulator is provided between the fourth-station large surface milling machine and the fifth-station computer numerical control universal machining center; the waste box for storing defective products is provided between a first station and a second station and between a fourth station and a fifth station respectively; the discharging box for storing finished products is provided on a front side of the fifth-station computer numerical control universal machining center; and two grooves are provided in parallel on the ground on both the front side and the rear side of the first-station to the fifth-station milling machines of the production line, two scrap conveying mechanisms for transporting scraps are provided in parallel in the grooves, and the scrap conveying mechanism is sloped out of the ground at the end of the production line to send the scraps above the ground and finally into a scrap box.

The automatic feeding device includes a tray switching device, a disc-type material storage device, and a lifting device, where the tray switching device is of an elongated structure, two disc-type material storage devices are arranged above the tray switching device side by side above, each disc-type material storage device is annularly provided with ten material boxes, and each material box is provided with one lifting device; the tray switching device transports a fed disc-type material storage device to one side through screw drive and transports another fed disc-type material storage device to below the first-station mechanical arm, the lifting device lifts workpieces in a material box to a specific height in sequence, the first-station mechanical arm takes away the workpieces, and after all the workpieces in the material boxes are taken away, the tray switching device rotates at a particular angle to switch to a next material box; and after the ten material boxes on the current disc-type material storage device are all emptied, the tray switching device moves the emptied disc-type material storage device to one side for workers to fill workpieces, and at the same time, another disc-type material storage device filled with workpieces is moved to below the first-station mechanical arm to continue feeding, and so on, to achieve automatic continuous feeding.

The first-station large surface milling machine includes a bed I, a machine tool protective cover I, an interchangeable flexible clamp, and a vertical milling machine, where the machine tool protective cover I and the interchangeable flexible clamp are arranged above the bed I, two identical vertical milling machines are respectively arranged on both sides of the bed I, and the two vertical milling machines are staggered by a distance of one workpiece, for catching tools during milling of an upper surface; a screw drive mechanism is provided inside the bed I, for driving the interchangeable flexible clamp to advance and rewind; when a workpiece is relatively small, the interchangeable flexible clamp moves the workpiece to one side of the bed I through a cylinder slide below, and a single vertical milling machine completes milling and machining of an upper surface of the workpiece; when the workpiece is relatively large, the interchangeable flexible clamp moves the workpiece to the middle of the bed I, and two vertical milling machines catch the tools successively to complete milling and machining of the upper surface of the workpiece; and the machine tool protective cover I is in a shape of a herringbone, for guiding scraps into scrap chutes on two sides of the machine tool.

The second-station side milling machine includes a bed II, a machine tool protective cover II, a flexible clamp, and a horizontal milling machine, where the machine tool protective cover II and the flexible clamp are provided above the bed II, two identical horizontal milling machines are symmetrically arranged on two sides of the bed II, for milling two side faces of a workpiece at the same time; a screw drive mechanism is provided inside the bed II, for driving the flexible clamp to advance and rewind; and the horizontal milling machine adjusts a distance between two milling cutters through an internal hydraulic slide to implement machining of parts with different widths, and the machine tool protective cover II is in a shape of a herringbone, for guiding scraps into scrap chutes on two sides of the machine tool.

The third-station side chamfering milling machine includes a bed II, a machine tool protective cover II, a flexible clamp, and a horizontal milling machine, where four horizontal milling machines are symmetrically arranged on two sides of the bed II, where two horizontal milling machines on the front side are mounted with face milling cutters, for milling two side faces of a workpiece at the same time, and two horizontal milling machines on the rear side are mounted with chamfering milling cutters, for milling chamfers on two sides of the workpiece at the same time, and other structures and functions are the same as those of the second-station side milling machine.

The fourth-station large surface milling machine has the same structure and function as the first-station large surface milling machine, for machining of a last large face of a workpiece.

The truss conveying device includes a first-station mechanical arm, a second-station mechanical arm, a third-station mechanical arm, a fourth-station mechanical arm, a truss, a rotatable clamping device, a reversible clamping device, and a column, where the truss is fixed to four columns, and the first-station mechanical arm, the second-station mechanical arm, the third-station mechanical arm, and the fourth-station mechanical arm are placed in a linear shape in sequence on a front side of the truss; and each mechanical arm is driven by a motor to move in a horizontal direction and a vertical direction on the truss, to convey a workpiece between the first to the fourth stations, where the rotatable clamping device is fixed under the first, third, and fourth-station mechanical arms, for rotating the workpiece by 90 degrees during the conveying to achieve side change of the workpiece; and the reversible clamping device is fixed below the second-station mechanical arm, for flipping the workpiece by 180 degrees during the conveying to achieve face change of the workpiece.

The four-axis two-jaw manipulator includes a clamping device, an industrial camera II, a connecting plate, and a four-axis robot, where the connecting plate is fixed to a lower end of a screw of the four-axis robot, and two clamping devices are fixed to a lower end of the connecting plate, for gripping, conveying, and blanking a workpiece; the industrial camera II is fixed to a front side of the clamping device, for capturing workpiece surface quality images of the fourth station, to identify defective products.

The scrap conveying mechanism includes a right end sprocket, a motor, a bracket, a roller, a chain, a left end sprocket, and a scraper conveyor belt, where the bracket is arranged underground in an elongated shape, a section of the bracket on a right side protrudes from the ground in a shape of a slope, the right end sprocket is provided at an upper right end, the left end sprocket is provided at a left end, and two chains surround front and rear sides of the bracket and between the sprockets on left and right sides, one scraper conveyor belt wraps around the two chains in a ring shape, and the roller is provided at a turning point of the slope of the bracket, for limiting the chain from ramping up together with a right side of the bracket; the motor fixed to the outer side of the right end sprocket at the right end is driven by engagement of the sprocket and the chain, to drive the scraper conveyor belt to rotate in a cycle between left and right ends to transport scraps; and a scraper is provided above the scraper conveyor belt at intervals of a distance to ensure that the scraps do not slide down during climbing of a slope.

Further, preferably, the tray switching device includes a stepper motor I, a motor drive base, a sliding base, a ball screw, a slider I, a bearing seat, a screw nut, a linear guide, and an outer base, where the motor drive base and the stepper motor I are fixed to a left end of the outer base, the bearing seat is fixed to a right end of the outer base, and the ball screw is connected to the middle of the outer base, two linear guides are arranged in parallel on two sides, and two identical sliding bases are arranged above the outer base for carrying the disc-type material storage device; and four sliders I and one screw nut are fixed under the sliding base, the slider I is slidable on the linear guide, the screw nut is in threaded fit with the ball screw and is driven by the motor to move back and forth on the ball screw, to in turn drive the sliding base to move back and forth on the outer base, the two sliding bases are mounted on a same lead screw and driven by the motor, to achieve synchronous switching of an empty tray and a feeding tray.

Further, preferably, the disc-type material storage device includes the lifting device, a pound-sign-type material box, a rotating disc, a flange plate, a motor fixing base plate, a stepper motor II, a base bracket, and a base connecting plate, where multiple holes are equally formed in the rotating disc along a circumference, and the pound-sign-type material box includes four L-shaped steel frames and is fixed to the rotating disc through the holes, where two steel frames on the outer side can be fixed in different holes to adjust a size of the pound-sign-type material box, thereby achieving storage of workpieces of different sizes; the stepper motor II is connected to the rotating disc through the flange plate, and drives the rotating disc to rotate around a central axis at particular intervals at a particular angle, to achieve switching of the pound-sign-type material box fixed above the rotating disc; and the motor fixing base plate fixes the stepper motor II to the base bracket, and the base bracket is fixed to the tray switching device by the base connecting plate.

Further, preferably, the lifting device includes an external frame, a guide rod, a ball screw, a slider III, a bottom plate, a connecting plate, and a stepper motor III, where the stepper motor III is fixed to a lower side of the rotating disc through the connecting plate, the external frame is fixed to an upper side of the rotating disc, two guide rods are provided inside the external frame, the slider III is slidable on the guide rod, and the stepper motor III drives, through thread engagement between the ball screw and the slider, the bottom plate at a front end of the slider III to move up and down to achieve lifting and lowering of a workpiece.

Further, preferably, the interchangeable flexible clamp includes a cylinder, a clamp, a positioning plane, a stopper, a clamp base, a pneumatic slide, and a slide base, where four pneumatic slides are fixed above the slide base, the clamp base is fixed above the pneumatic slide, the positioning plane is fixed to the middle of the clamp base, for placing a workpiece, the stopper is fixed to a right side of the clamp base, two cylinders are fixed to a left side of the clamp base, and the clamp is fixed to a front end of the cylinder, for clamping the workpiece; and the pneumatic slide can slide back and forth to drive the clamp base above to move back and forth on the slide base, to change a clamp machining position.

Further, preferably, the vertical milling machine includes a base, a sliding table, a motor, a belt, a vertical spindle, and a lead screw, where the lead screw driven by hydraulic pressure is provided inside the base, the sliding table is provided on a front side of the base, the vertical spindle is provided on a front side of the sliding table, and the motor is provided on a rear side of the sliding table; the motor drives, through the belt, the vertical spindle to perform a rotation motion, to drive a cutter below to perform a cutting motion; and the sliding table is in threaded fit with the lead screw, and therefore can slide up and down on a sliding track on the front side of the base, thereby changing a machining height of the vertical spindle, to achieve machining of parts with different thicknesses.

Further, preferably, the first-station mechanical arm includes a column, a truss, a truss rack, a limiting screw, a worm gear drive, a Z-axis servo motor, a mechanical arm rack, a cross slide, a mechanical arm, and a rotatable clamping device, where the truss is horizontally fixed to the column, the truss rack is fixed to an upper side of the truss, the cross slide is mounted on a front side of the truss, an X-axis servo motor is mounted on a rear side of the cross slide, the mechanical arm is provided on a front side of the cross slide along a Z-axis, the worm gear drive is mounted on a left side of the cross slide, and an input end above the worm gear drive is connected to an output end of the Z-axis servo motor; an output end of the X-axis servo motor drives, through the engagement between the truss rack and gears, the cross slide to move back and forth along an X-axis, for material conveying between stations; the Z-axis servo motor drives, through the engagement between the mechanical arm rack and a gear at an output end of the worm gear drive, the mechanical arm to move up and down along the Z-axis, for picking and placing materials on the station; the limiting screw is provided at two ends of the truss, for limiting a distance by which the cross slide moves back and forth and cushioning and stopping movement of the cross slide; and the rotatable clamping device is fixed to a lower end of the mechanical arm, for clamping a workpiece.

Further, preferably, the reversible clamping device is fixed to a lower end of the second-station mechanical arm, and other structures and functions are the same as those of the first-station mechanical arm; and the third-station mechanical arm and the fourth-station mechanical arm have the same structure and function as the first-station mechanical arm.

Further, preferably, the rotatable clamping device includes an upper-end connecting plate, a rotatable cylinder, an intermediate connecting plate, a parallel gripper, and a clamping plate, where a cylinder body of the rotatable cylinder is connected to the mechanical arm through the upper-end connecting plate, a cylinder shaft of the rotatable cylinder is connected to the parallel gripper through the intermediate connecting plate, and a clamping plate is fixed under each jaw on both sides of the parallel gripper, for clamping and pressing a workpiece; and the cylinder shaft of the rotatable cylinder rotates to drive the parallel gripper below to rotate, to achieve rotation side change of a clamped workpiece.

Further, preferably, the reversible clamping device includes an upper-end connecting plate, a rotatable cylinder, an intermediate connecting plate, a parallel gripper, a cylinder fixing plate, a reversible cylinder, a clamping plate, and an industrial camera I, where a cylinder fixing plate is fixed under each jaw on both sides of the parallel gripper, a reversible cylinder is fixed on each outer side of the cylinder fixing plate, and a cylinder shaft of the reversible cylinder passes through the cylinder fixing plate and is connected to the clamping plate; cylinder shafts on both sides of the reversible cylinder are driven by a same pneumatic source to rotate, to drive clamping plates on two sides to rotate at the same time, thereby achieving flipping and face change of a clamped workpiece; the industrial camera I is fixed to a front side of the parallel gripper by screws on both sides, for capturing surface quality images of a workpiece at the second station to identify defective products; and other structures and functions of the reversible clamping device are the same as those of the rotatable clamping device.

Compared with the prior art, the present invention has the following beneficial effects:

(1) The combination of multiple special equipment and single universal equipment ensures production efficiency, achieves flexibility of the production line, and reduces manufacturing costs. Characteristics of high production efficiency and poor flexibility of the special equipment are relatively fully considered, and four types of processes with the same plates and a large margin are completed on special machining equipment. Considering characteristics of good flexibility and relatively low production efficiency of the universal equipment, the remaining different processes with a small margin are completed on the universal machining equipment, to achieve capacity matching, ensure production efficiency, achieve the unification of four different types of plate machining procedures, and then initially achieve the flexible production of the four types of plates in the production line. In addition, the special machining equipment is used as much as possible while the flexibility of the production line is ensured, thereby reducing a quantity of universal equipment and effectively reducing the manufacturing costs.

(2) The automatic production of plate parts is achieved through the appropriate arrangement of the machining procedure and the appropriate combination of the devices of the production line. Each station is clamped by a gripper clamping plate after being pressed, to ensure stable clamping. After an upper surface of a workpiece is milled at the first station, the workpiece is turned over by a flipping device, and the remaining four processes of machining are completed with the machined surface as a reference surface, so as to reflect the process principle of no duplication of coarse reference and unification of fine reference, thereby ensuring workpiece machining quality.

(3) The stations are appropriately allocated, the process with a large margin is divided into four processes of milling the upper surface, the lower surface, the left and right side faces, and the front and rear side faces and allocated to the four special equipment to complete, making full use of the characteristic of high machining efficiency of the special equipment. The remaining processes such as milling grooves and drilling with small margins are allocated to a universal equipment to complete, effectively avoiding the impact of low machining efficiency of the universal equipment. Through the appropriate division of the foregoing five stations, balanced matching of machining times of the stations is achieved, bottleneck processes are eliminated, and the production efficiency is improved.

(4) An industrial camera is mounted on a front side of the gripper, such that surface quality can be quickly identified before a mechanical arm descends to grab a workpiece. A system controls the mechanical arm to throw an unqualified workpiece into a waste box between two stations, to achieve intelligent sorting of defective products during machining in the production line. The industrial camera is small in size and the identification process is fast, which does not affect gripping actions and gripping times of the gripper.

(5) A hydraulic driving mechanism is provided inside a power head sliding table of the special machining equipment, and can automatically adjust a machining position of the power head, and achieve flexible machining of parts of different sizes.

The hydraulic mechanism has stable execution actions, high positioning accuracy, and convenient and flexible layout, which greatly improves the automation and flexibility levels of the special machining equipment and also controls the manufacturing costs.

(6) The mechanical arm is designed with a two-axis truss mechanical arm, which has simple and consistent movement, a high movement speed, high positioning accuracy, and a small quantity of mechanical arm axes, making full use of its degrees of freedom and controlling the manufacturing costs. A pneumatic hand grip is arranged under the mechanical arm, can rotate and flip a workpiece while conveying the workpiece, and automatically centers and positions the workpiece during placement. The action is coherent, stable, and reliable, which greatly reduces an auxiliary time and improves the production efficiency.

(7) The clamp uses a single cylinder on one side, and a stopper is used on the other side to block the workpiece, reducing a quantity of cylinders and reducing the manufacturing costs. A pneumatic slide is provided between a clamp on the special machining equipment for the first station and the fourth station and a table, such that the clamp can slide back and forth between two positions of a vertical guide on the table, thereby achieving automatic switching of machining positions of parts of different sizes without replacement of the clamp, with rapid action and high positioning accuracy, which greatly improves the automation and flexibility levels of the special machining equipment. In addition, this replaces movement in a Y-axis direction of a truss mechanical arm to some extent, reduces a quantity of mechanical arm axes, and reduces the manufacturing costs.

(8) The feeding mechanism uses a layout method in which automatic feeding is used for one material tray, manual filling is used for the other material tray, and switching is performed between the two material trays, which greatly increases an interval time of feeding, greatly reduces labor intensity of workers, and reduces working hours. A screw drive mechanism is provided under the two material trays. The screw drive mechanism can automatically complete synchronous switching of an empty tray and a material tray filled with workpieces in a gap between feeding and returning of the mechanical arm, and complete positioning of the material trays through self-locking of a lead screw. The entire action is fast and stable, without affecting the feeding time, and the positioning accuracy is high.

(9) A four-axis two-jaw manipulator with two pneumatic hand grips configured thereon is provided between the special machining equipment and the universal machining equipment. In this way, a next workpiece can be placed immediately while the workpiece is taken away from the universal machining equipment. The action is fast and coherent, which greatly reduces an auxiliary time and improves the production efficiency. The use of four axes for the robot makes full use of its degrees of freedom, thereby controlling the manufacturing costs.

(10) Two chain-plate type scrap conveyors are used in the design of the scrap conveying mechanism, respectively arranged between the bed and the base and buried in the ground, such that scraps can be well collected and the space can be appropriately used, without interference with machine tools.

Figure 1:
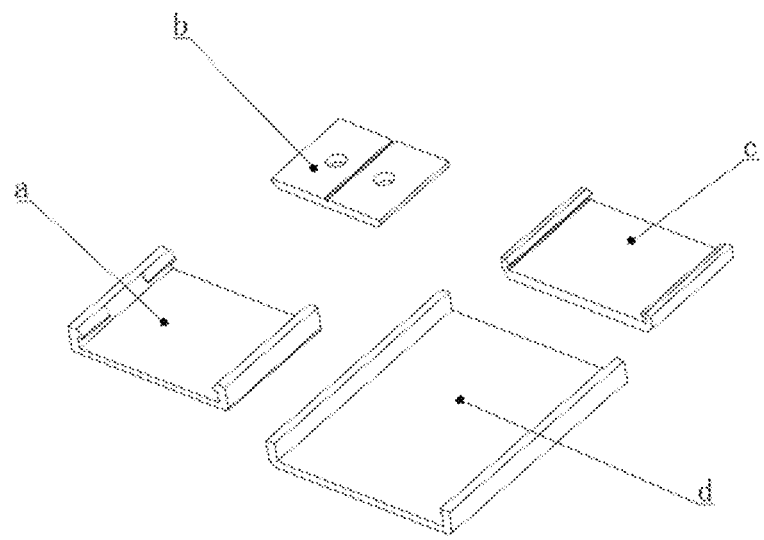
FIG. 1 is a schematic diagram of four types of plate parts to be machined.

In the drawings: 1. first-station large surface milling machine; 1-1. bed I; 1-2. machine tool protective cover I; 1-3. interchangeable flexible clamp; 1-4. vertical milling machine;

1-3. interchangeable flexible clamp; 1-3-1. cylinder; 1-3-2. clamp; 1-3-3. positioning plane; 1-3-4. stopper; 1-3-5. clamp base; 1-3-6. pneumatic slide; 1-3-7. slide base;

1-4. vertical milling machine; 1-4-1. base; 1-4-2. sliding table; 1-4-3. motor; 1-4-4. belt; 1-4-5. vertical spindle; 1-4-6. lead screw;

2. second-station side milling machine; 2-1. bed II; 2-2. machine tool protective cover II; 2-3. flexible clamp; 2-4. horizontal milling machine;

3. third-station side chamfering milling machine; 3-1. bed II; 3-2. machine tool protective cover II; 3-3. flexible clamp; 3-4. horizontal milling machine;

4. fourth-station large surface milling machine;

5. fifth-station computer numerical control universal machining center;

6. automatic feeding device; 6-1. tray switching device; 6-2. disc-type material storage device; 6-3. lifting device;

6-1. tray switching device; 6-1-1. stepper motor I; 6-1-2. motor drive base; 6-1-3. sliding base; 6-1-4. ball screw; 6-1-5. slider I; 6-1-6. bearing seat; 6-1-7. screw nut; 6-1-8. linear guide; 6-1-9. outer base;

6-2. disc-type material storage device; 6-3. lifting device; 6-2-1. pound-sign-type material box; 6-2-2. rotating disc; 6-2-3. flange plate; 6-2-4. motor fixing base plate; 6-2-5. stepper motor II; 6-2-6. base bracket; 6-2-7. base connecting plate;

6-3. lifting device; 6-3-1. external frame; 6-3-2. guide rod; 6-3-3. ball screw; 6-3-4. slider II; 6-3-5. bottom plate; 6-3-6. connecting plate; 6-3-7. stepper motor III;

7. truss conveying device; 7-1. first-station mechanical arm; 7-2. second-station mechanical arm; 7-3. third-station mechanical arm; 7-4. fourth-station mechanical arm; 7-5. truss; 7-6. rotatable clamping device; 7-7. reversible clamping device; 7-8. column;

7-1. first-station mechanical arm; 7-1-1. truss rack; 7-1-2. limiting screw; 7-1-3. worm gear drive; 7-1-4. Z-axis servo motor; 7-1-5. mechanical arm rack; 7-1-6. cross slide; 7-1-7. mechanical arm;

7-6. rotatable clamping device; 7-6-1. upper-end connecting plate; 7-6-2. rotatable cylinder; 7-6-3. intermediate connecting plate; 7-6-4. parallel gripper; 7-6-5. clamping plate;

7-7. reversible clamping device; 7-7-1. upper-end connecting plate; 7-7-2. rotatable cylinder; 7-7-3. intermediate connecting plate; 7-7-4. parallel gripper; 7-7-5. cylinder fixing plate; 7-7-6. reversible cylinder; 7-7-7. clamping plate; 7-7-8. industrial camera I;

8. four-axis two-jaw manipulator; 8-1. rotatable clamping device; 8-2. industrial camera II; 8-3. connecting plate; 8-4. four-axis robot;

9. waste box;

10. discharging box;

11. scrap conveying mechanism; 11-1. right end sprocket; 11-2. motor; 11-3. bracket; 11-4. roller; 11-5. chain; 11-6. left end sprocket; 11-7. scraper conveyor belt.

DETAILED DESCRIPTION OF THE EMBODIMENTS

The following clearly and completely describes the technical solutions in the embodiments of the present invention with reference to the accompanying drawings in the embodiments of the present invention. Apparently, the described embodiments are merely some rather than all of the embodiments of the present invention. All other embodiments obtained by those of ordinary skill in the art based on the embodiments of the present invention without creative efforts shall fall within the protection scope of the present invention.

Referring to FIG. 1, the objective of a production line designed in the present invention is to produce four types of plate parts shown in FIG. 1.

Figure 2:
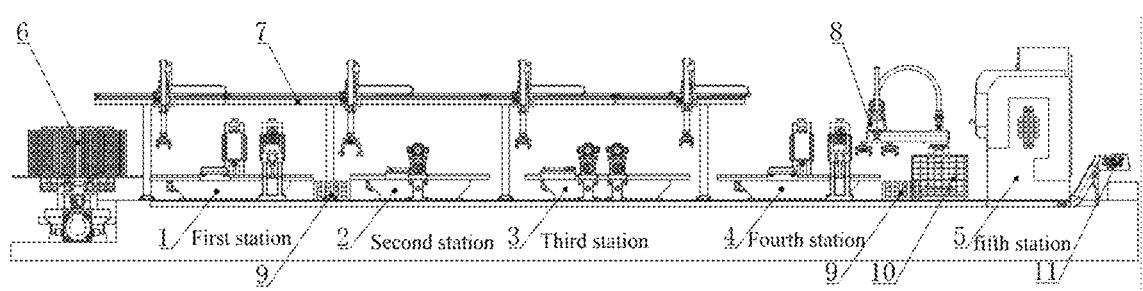
FIG. 2 is a horizontal layout diagram of an automated high-speed production line for multiple types of plate and frame parts according to the present invention.
Figure 3:
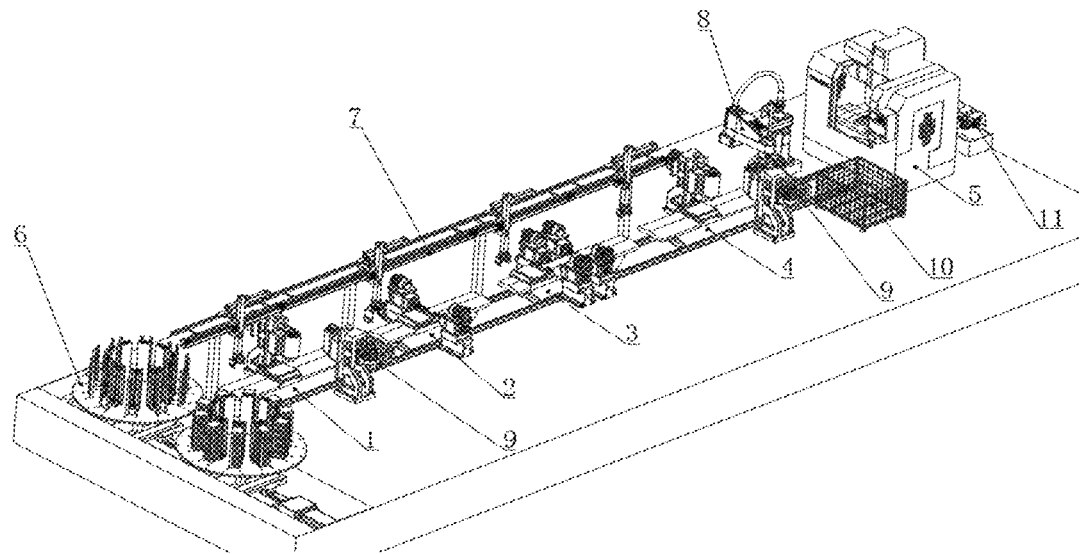
FIG. 3 is a schematic structural diagram of an automated high-speed production line for multiple types of plate and frame parts according to the present invention.

Referring to FIG. 2 and FIG. 3, the present invention provides a technical solution: an intelligent plate parts machining production line combining universal and special equipment, including a first-station large surface milling machine 1, a second-station side milling machine 2, a third-station side chamfering milling machine 3, a fourth-station large surface milling machine 4, a fifth-station computer numerical control universal machining center 5, an automatic feeding device 6, a truss conveying device 7, a four-axis two-jaw manipulator 8, a waste box 9, a discharging box 10, a scrap conveying mechanism 11, and a controller.

The production line is generally arranged in a straight line. The automatic feeding device 6 is arranged longitudinally at the beginning of the production line, and the first-station large surface milling machine 1, the second-station side milling machine 2, the third-station side chamfering milling machine 3, the fourth-station large surface milling machine 4, and the fifth-station computer numerical control universal machining center 5 are arranged in a linear shape in sequence horizontally on a front side perpendicular thereto. Truss conveying devices 7 are arranged in parallel on the rear side of the first-station to the fourth-station milling machines. The truss conveying device 7 is provided with a first-station mechanical arm 7-1, a second-station mechanical arm 7-2, a third-station mechanical arm 7-3, and a fourth-station mechanical arm 7-4 in sequence. The four-axis two-jaw manipulator 8 is provided between the fourth-station large surface milling machine 4 and the fifth-station computer numerical control universal machining center 5. The waste box 9 is provided between a first station and a second station and between a fourth station and a fifth station, for storing defective products. The discharging box 10 is provided on a front side of the fifth-station computer numerical control universal machining center 5, for storing finished products. The scrap conveying mechanism 11 is provided under the entire production line and buried underground, for collecting and transporting scraps from the first to the fifth stations.

The first-station mechanical arm 7-1, the second-station mechanical arm 7-2, the third-station mechanical arm 7-3, and the fourth-station mechanical arm 7-4 can move horizontally and vertically, for material conveying between the first four stations. The four-axis two-jaw manipulator 8 can rotate horizontally and ascend and descend vertically, for material conveying between the fourth and fifth stations and blanking of finished products on the fifth-station computer numerical control universal machining center 5.

Figure 4:
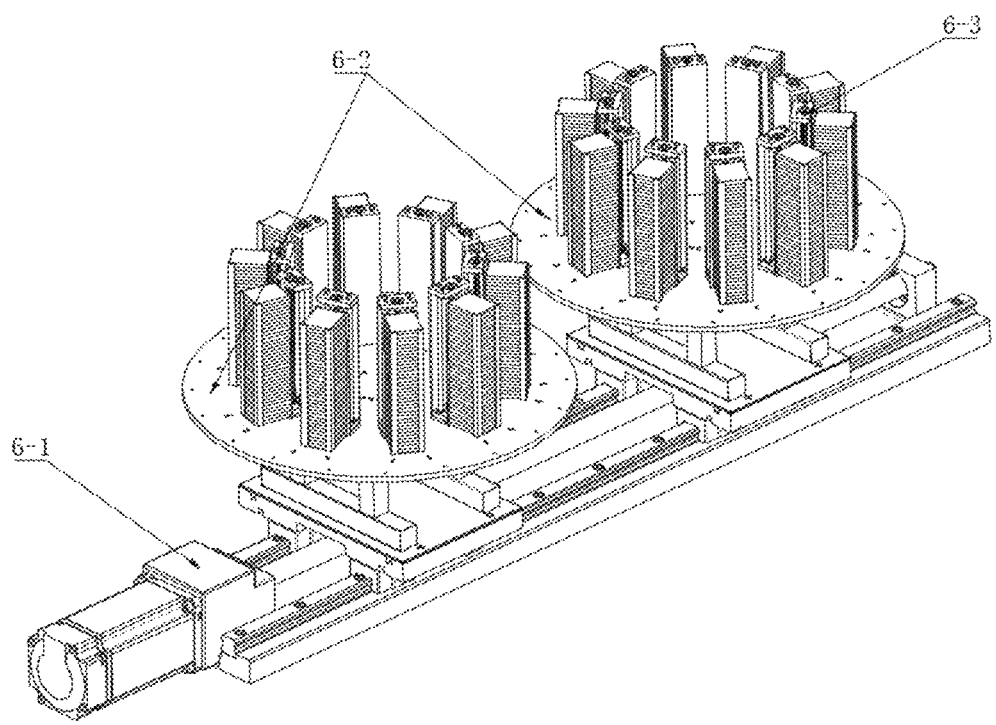
FIG. 4 is a schematic structural diagram of an automatic feeding device 6 in FIG. 3.

Referring to FIG. 4, a tray switching device 6-1 is of an elongated structure, provided with two disc-type material storage devices 6-2 above in a straight line, ten material boxes are evenly arranged above each disc-type material storage device 6-2, and each material box is internally provided with one lifting device 6-3. The tray switching device 6-1 transports a fed disc-type material storage device 6-2 to one side through screw drive and transports another fed disc-type material storage device 6-2 to below the first-station mechanical arm 7-1. The lifting device 6-3 lifts workpieces in a material box to a specific height in sequence, the first-station mechanical arm 7-1 takes away the workpieces, and after all the workpieces in the material boxes are taken away, the tray switching device 6-1 rotates at a particular angle to switch to a next material box. After ten material boxes on the disc-type material storage device 6-2 are all emptied, the tray switching device 6-1 moves the emptied disc-type material storage device 6-2 to one side for workers to fill workpieces, and at the same time, another disc-type material storage device 6-2 filled with workpieces is moved to below the first-station mechanical arm 7-1 to continue feeding, and so on, to achieve automatic continuous feeding.

Figure 5:
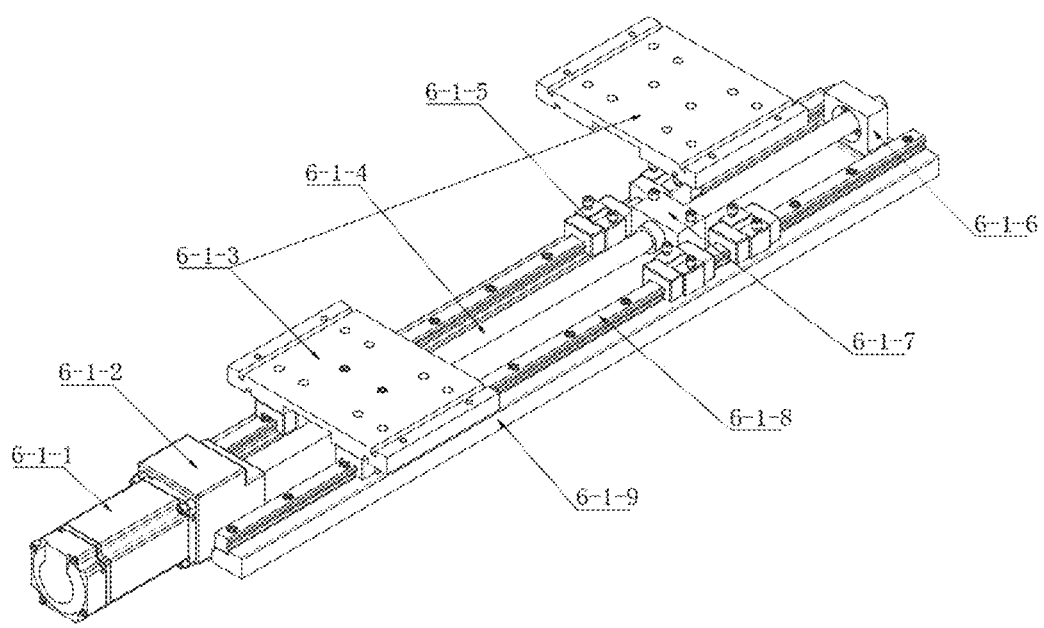
FIG. 5 is a schematic structural diagram of a tray switching device 6-1 in FIG. 4.

Referring to FIG. 5, a stepper motor I 6-1-1 is fixed to a left end of an outer base 6-1-9, a bearing seat 6-1-6 is fixed to a right end of the outer base 6-1-9, a ball screw 6-1-4 is connected to the middle of the outer base 6-1-9, two linear guides 6-1-8 are arranged in parallel on two sides, and two identical sliding bases 6-1-3 are arranged above for carrying the disc-type material storage device 6-2. Four sliders I 6-1-5 and one screw nut 6-1-7 are fixed under the sliding base 6-1-3, the slider I 6-1-5 is slidable on the linear guide 6-1-8, the screw nut 6-1-7 is in threaded fit with the ball screw 6-1-4 and is driven by a motor to move back and forth on the ball screw 6-1-4, to in turn drive the sliding base 6-1-3 to move back and forth on the outer base 6-1-9, to achieve switching of material trays.

Figure 6:
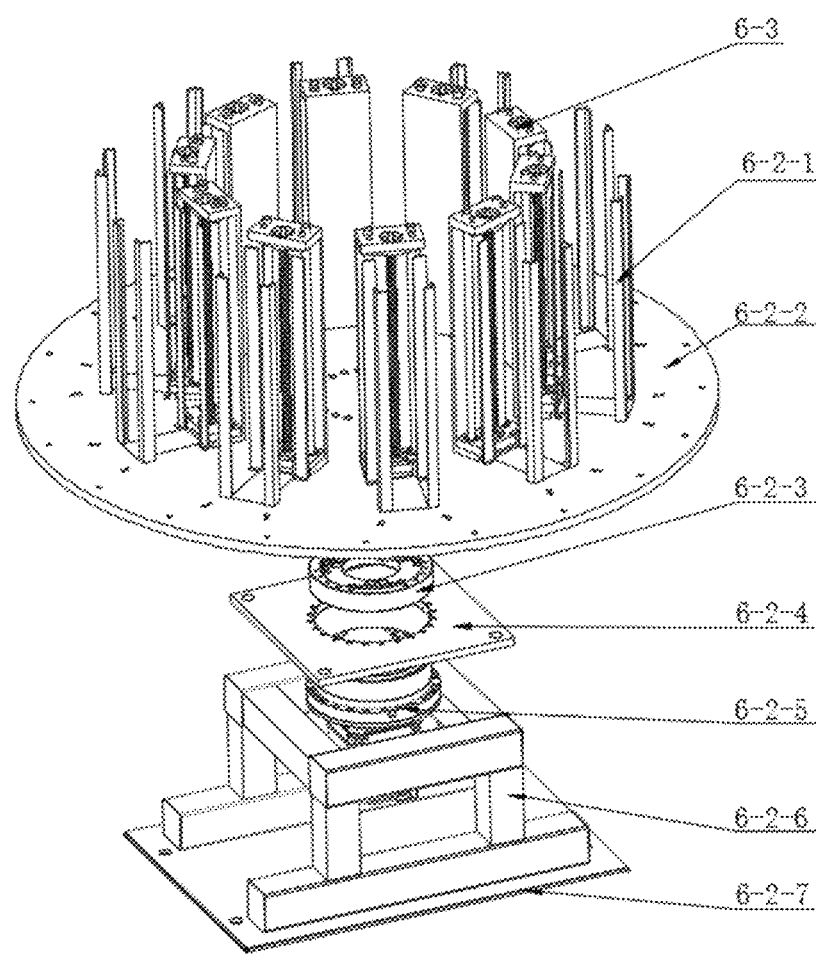
FIG. 6 is a schematic structural diagram of a disc-type material storage device 6-2 in FIG. 4.

Referring to FIG. 6, multiple holes are formed in a rotating disc 6-2-2, and a pound-sign-type material box 6-2-1 includes four L-shaped steel frames and is fixed to the rotating disc 6-2-2 through the holes, where two steel frames on the outer side can be fixed in different holes to adjust a size of the pound-sign-type material box 6-2-1, thereby achieving storage of workpieces of different sizes. A stepper motor II 6-2-5 is connected to the rotating disc 6-2-2 through a flange plate 6-2-3, and drives the rotating disc 6-2-2 to rotate around a central axis at particular intervals at a particular angle, to achieve switching of the pound-sign-type material box 6-2-1 fixed above the rotating disc 6-2-2. A motor fixing base plate 6-2-4 fixes the stepper motor II 6-2-5 to a base bracket 6-2-6, and the base bracket 6-2-6 is fixed to the tray switching device 6-1 by a base connecting plate 6-2-7.

Figure 7:
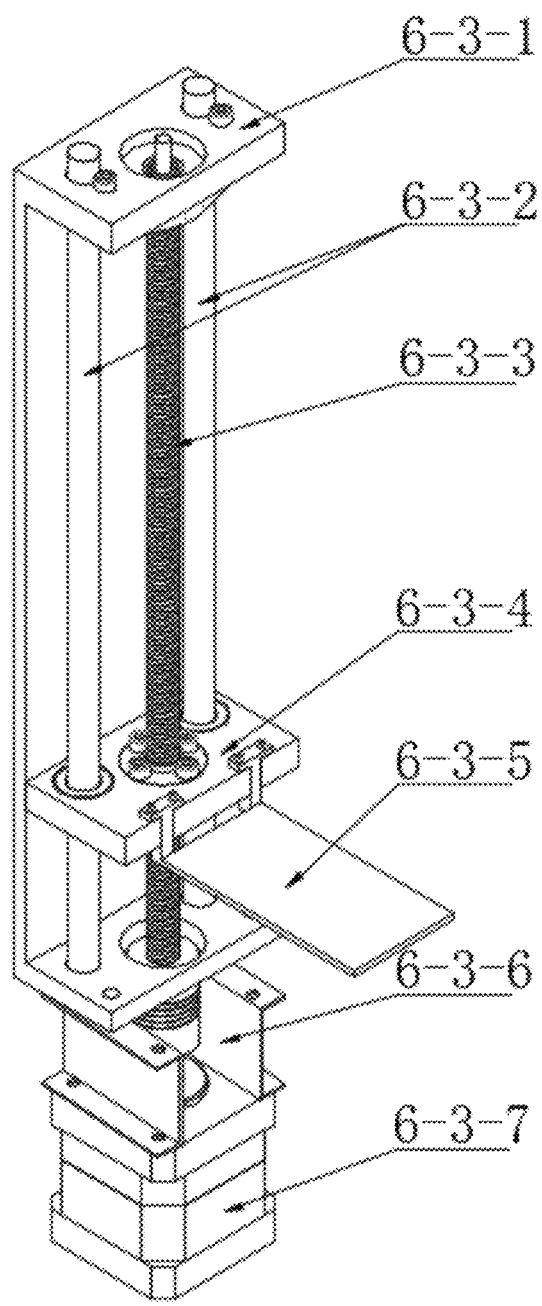
FIG. 7 is a schematic structural diagram of a lifting device 6-3 in FIG. 4.

Referring to FIG. 7, a stepper motor III 6-3-7 is fixed to a lower side of the rotating disc 6-2-2 through a connecting plate 6-3-6, an external frame 6-3-1 is fixed to an upper side of the rotating disc 6-2-2, two guide rods 6-3-2 are provided inside the external frame 6-3-1, a slider III 6-3-4 is slidable on the guide rod 6-3-2, and the stepper motor III 6-3-7 is in threaded fit with a ball screw 6-3-3 and the slider III 6-3-4, and drives a bottom plate 6-3-5 at a front end of the slider III 6-3-4 to move up and down, to achieve lifting and lowering of a workpiece.

Figure 8:
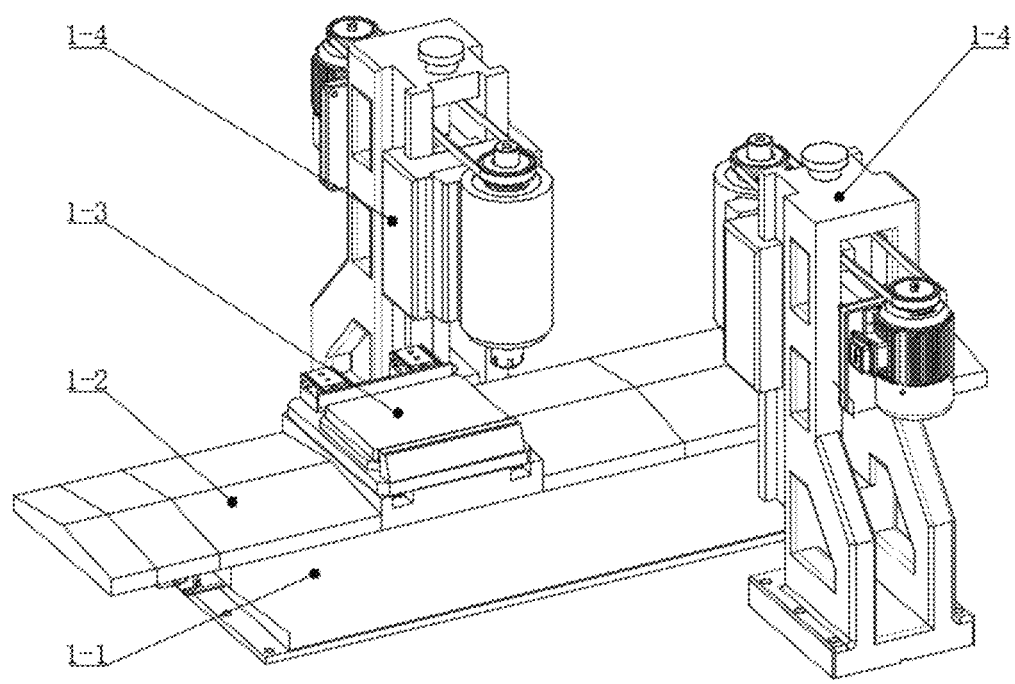
FIG. 8 is a schematic structural diagram of a first-station large surface milling machine in FIG. 2.

Referring to FIG. 8, a machine tool protective cover I 1-2 and an interchangeable flexible clamp 1-3 are provided above a bed I 1-1, two identical vertical milling machines 1-4 are respectively arranged on both sides of the bed I 1-1, and the two vertical milling machines 1-4 are staggered by a distance of one workpiece, for catching tools during milling of an upper surface. A screw drive mechanism is provided inside the bed I 1-1, for driving the interchangeable flexible clamp 1-3 to advance and rewind. When a workpiece is relatively small, the interchangeable flexible clamp 1-3 moves the workpiece to one side of the bed I 1-1 through a cylinder slide below, and a single vertical milling machine 1-4 completes milling and machining of an upper surface of the workpiece. When the workpiece is relatively large, the interchangeable flexible clamp 1-3 moves the workpiece to the middle of the bed I 1-1, and two vertical milling machines 1-4 catch the tools successively to complete milling and machining of the upper surface of the workpiece. The machine tool protective cover I 1-2 is in a shape of a herringbone, for guiding scraps into scrap chutes on two sides of the machine tool.

Figure 9:
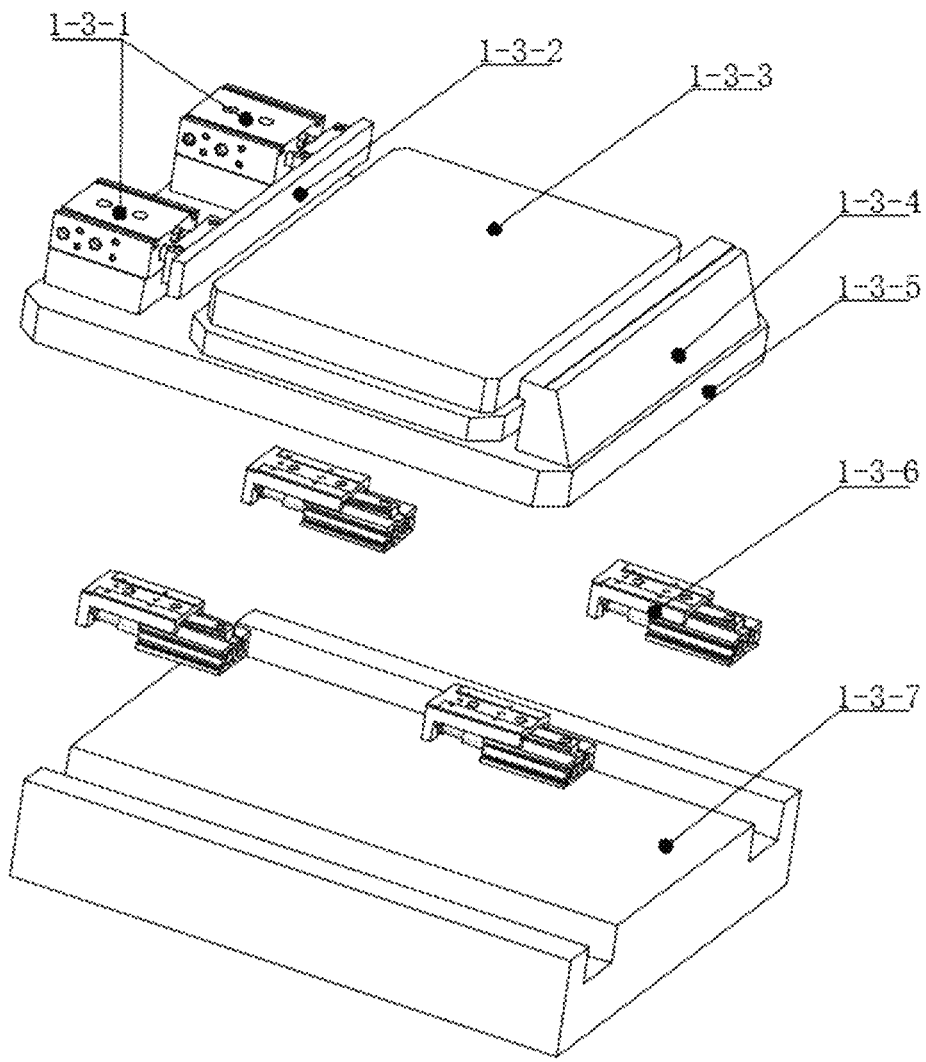
FIG. 9 is a schematic structural diagram of an interchangeable flexible clamp 1-3 in FIG. 8.

Referring to FIG. 9, four pneumatic slides 1-3-6 are fixed above a slide base 1-3-7, a clamp base 1-3-5 is fixed above the pneumatic slide 1-3-6, a positioning plane 1-3-3 is fixed to the middle of the base 1-3-5, for placing a workpiece, a stopper 1-3-4 is fixed to a right side of the base 1-3-5, two cylinders 1-3-1 are fixed to a left side of the base 1-3-5, and a clamp 1-3-2 is fixed to a front end of the cylinder 1-3-1, for clamping the workpiece. The pneumatic slide 1-3-6 can slide back and forth to drive the clamp base 1-3-5 above to move back and forth on the slide base 1-3-7, to change a clamp machining position.

Figure 10:
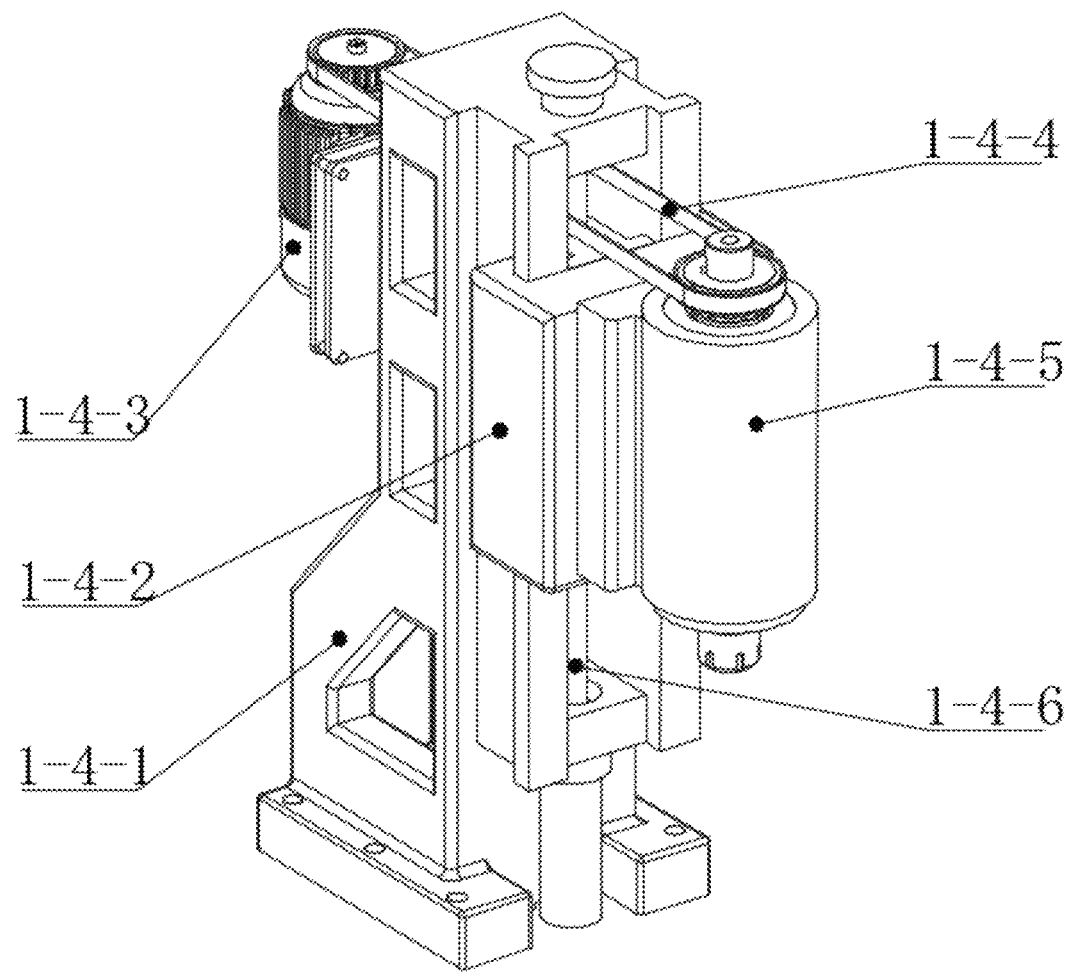
FIG. 10 is a schematic structural diagram of a vertical milling machine 1-4 in FIG. 8.

Referring to FIG. 10, a lead screw 1-4-6 driven by hydraulic pressure is provided inside a base 1-4-1, a sliding table 1-4-2 is provided on a front side of the base 1-4-1, a vertical spindle 1-4-5 is provided on a front side of the sliding table 1-4-2, and a motor 1-4-3 is provided on a rear side of the sliding table 1-4-2. The motor 1-4-3 drives, through a belt 1-4-4, the vertical spindle 1-4-5 to perform a rotation motion, to drive a cutter below to perform a cutting motion. The sliding table 1-4-2 is in threaded fit with the lead screw 1-4-6, and therefore can slide up and down on a sliding track on the front side of the base 1-4-1, thereby changing a machining height of the vertical spindle 1-4-5, to achieve machining of parts with different thicknesses.

Figure 11:
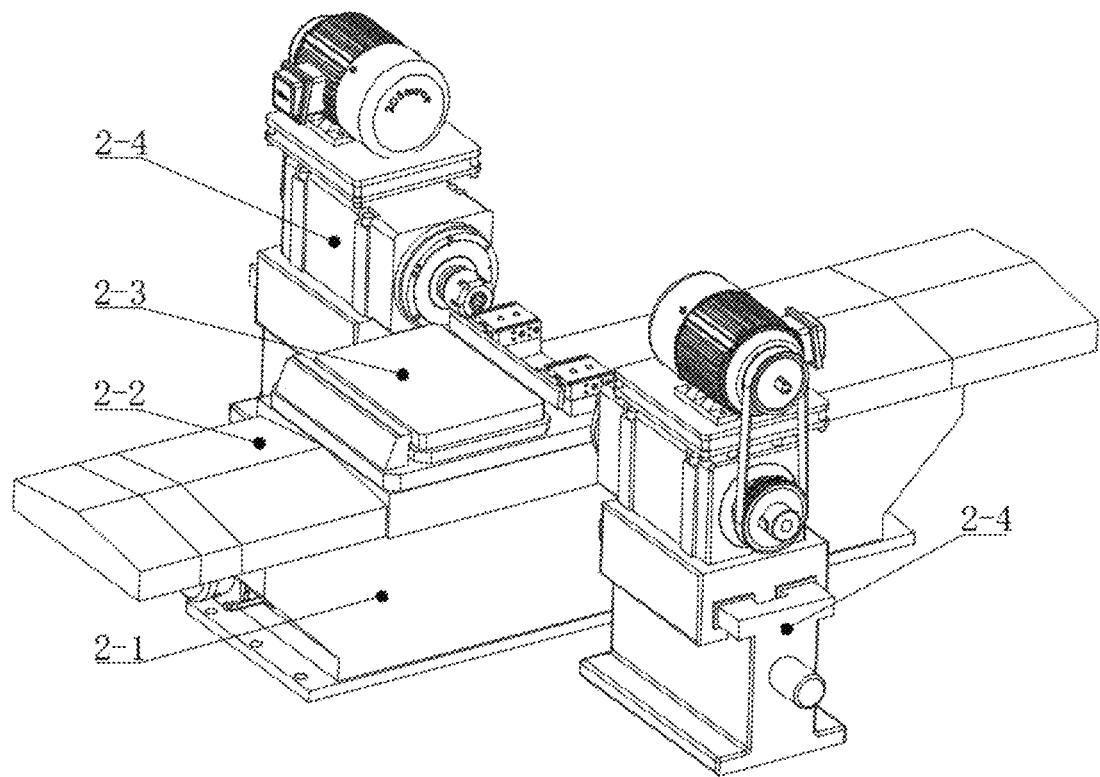
FIG. 11 is a schematic structural diagram of a second-station side milling machine 2 in FIG. 2.

Referring to FIG. 11, a machine tool protective cover II 2-2 and a flexible clamp 2-3 are provided above a bed II 2-1, two identical horizontal milling machines 2-4 are symmetrically arranged on two sides of the bed II 2-1, for milling two side faces of a workpiece at the same time. A screw drive mechanism is provided inside the bed II 2-1, for driving the flexible clamp 2-3 to advance and rewind. The horizontal milling machine 2-4 adjusts a distance between two milling cutters through an internal hydraulic slide to implement machining of parts with different widths. The machine tool protective cover II 2-2 is in a shape of a herringbone, for guiding scraps into scrap chutes on two sides of the machine tool.

Figure 12:
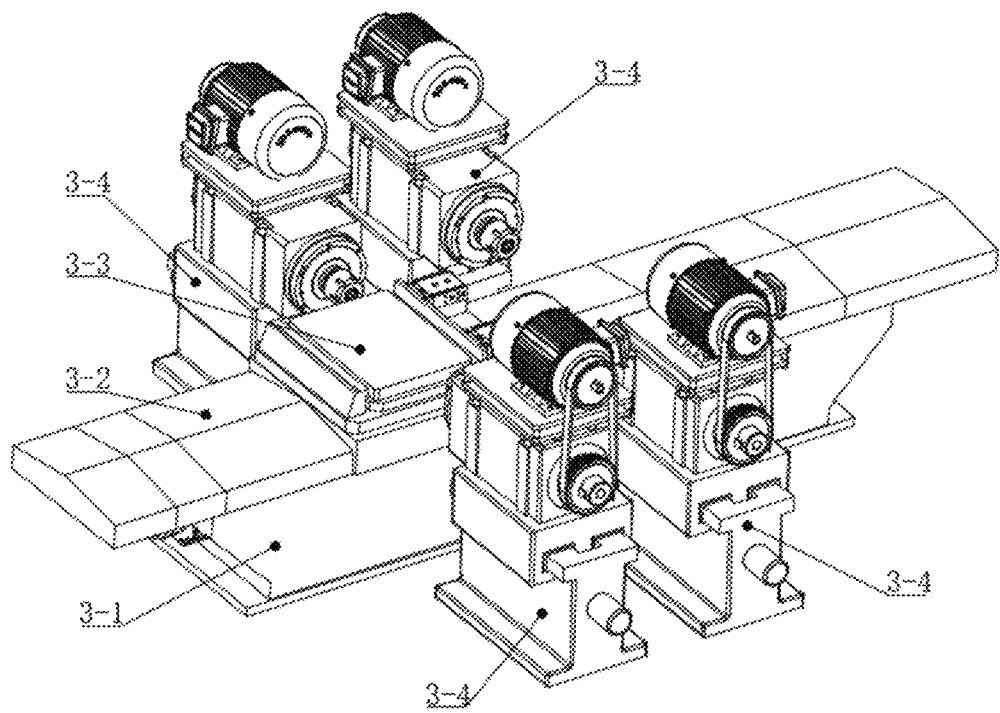
FIG. 12 is a schematic structural diagram of a third-station side chamfering milling machine 3 in FIG. 2.

Referring to FIG. 12, four horizontal milling machines 3-4 are symmetrically arranged on two sides of a bed II 3-1. Two horizontal milling machines 3-4 on the front side are mounted with face milling cutters, for milling two side faces of a workpiece at the same time. Two horizontal milling machines 3-4 on the rear side are mounted with chamfering milling cutters, for milling chamfers on two sides of the workpiece at the same time. Other structures and functions are the same as those of the second-station side milling machine 2.

Figure 13:
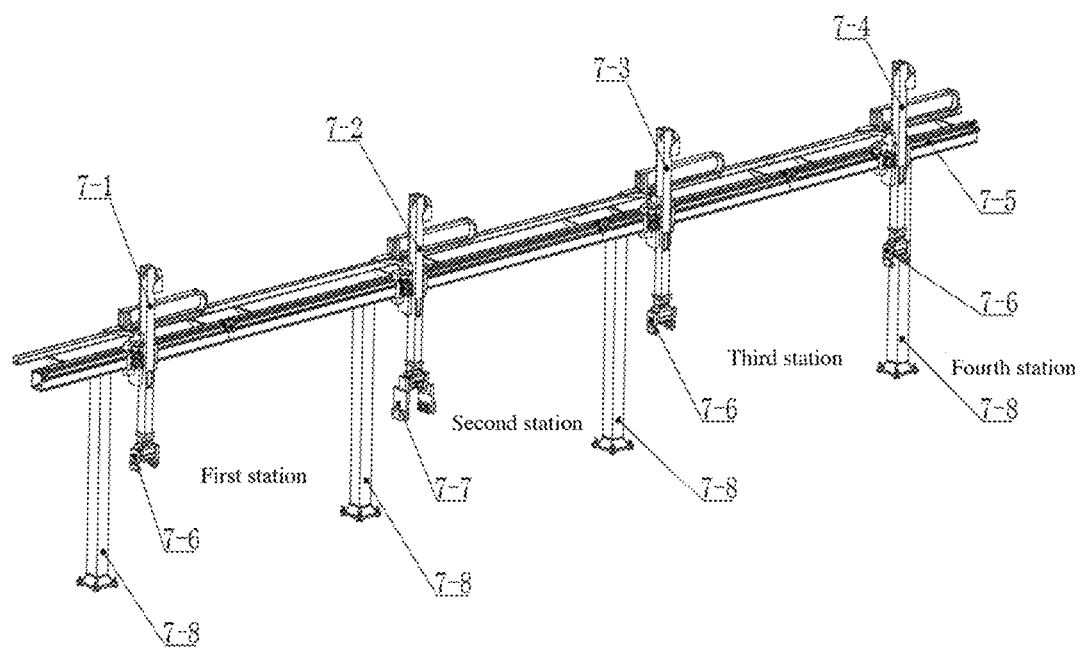
FIG. 13 is a general layout diagram of a truss conveying device 7 in FIG. 2.

Referring to FIG. 13, a truss 7-5 is fixed to four columns 7-8, and a first-station mechanical arm 7-1, a second-station mechanical arm 7-2, a third-station mechanical arm 7-3, and a fourth-station mechanical arm 7-4 are arranged in a linear shape in sequence on a front side of the truss 7-5. Each mechanical arm is driven by a motor to move laterally and longitudinally on the truss 7-5, to convey a workpiece between the first four stations. A rotatable clamping device 7-6 is fixed under the first, third, and fourth-station mechanical arms, and can rotate the workpiece by 90 degrees during the conveying to achieve side change of the workpiece. A reversible clamping device 7-7 is fixed below the second-station mechanical arm 7-2, and can flip the workpiece by 180 degrees during the conveying to achieve face change of the workpiece.

Figure 14:
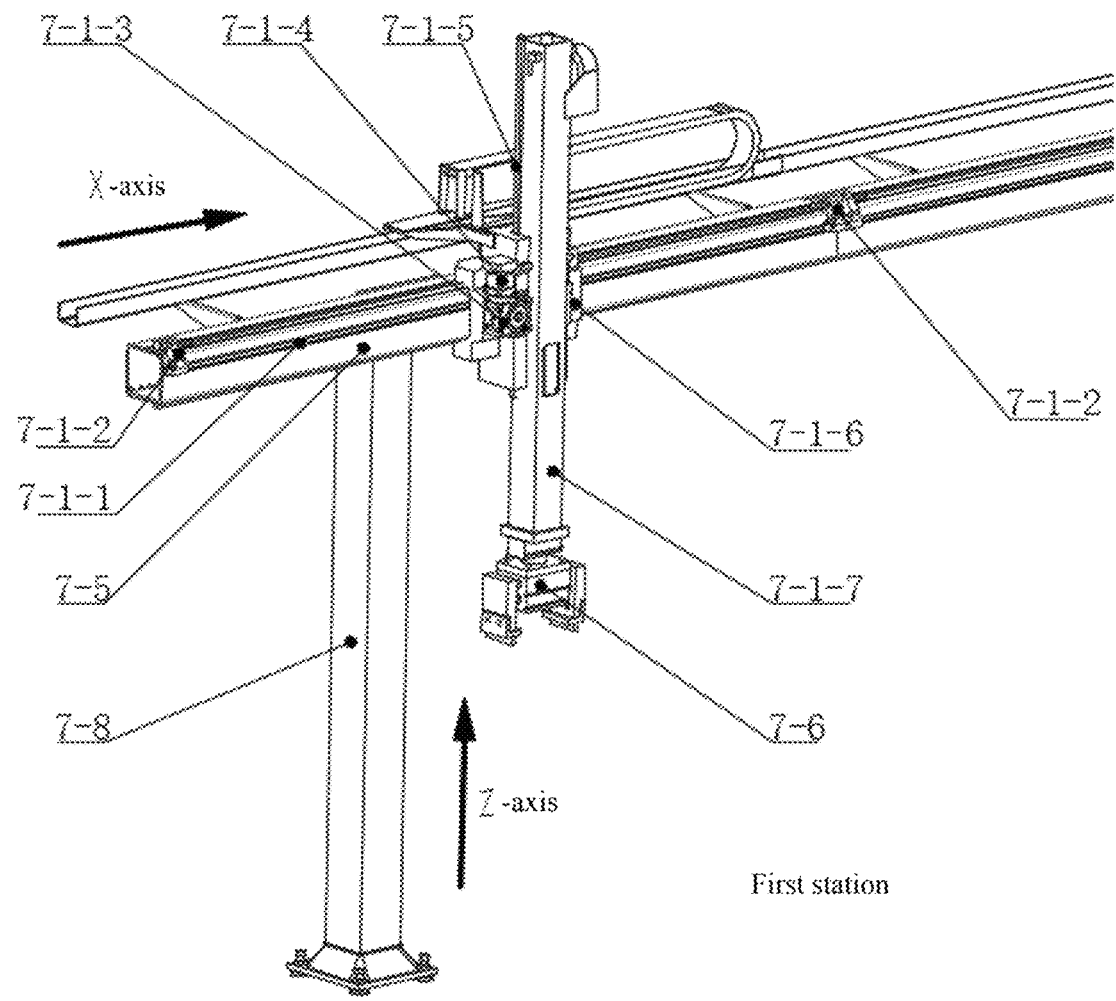
FIG. 14 is a schematic structural diagram of a first-station mechanical arm 7-1 in FIG. 13.

Referring to FIG. 14, the truss 7-5 is horizontally fixed to the column 7-8, a truss rack 7-1-1 is fixed to an upper side of the truss 7-5, a cross slide 7-1-6 is mounted on a front side of the truss 7-5, an X-axis servo motor is mounted on a rear side of the cross slide 7-1-6, a mechanical arm 7-1-7 is provided on a front side of the cross slide 7-1-6 along a Z-axis, a worm gear drive 7-1-3 is mounted on a left side of the cross slide 7-1-6, and an input end above the worm gear drive 7-1-3 is connected to an output end of a Z-axis servo motor 7-1-4. An output end of the X-axis servo motor drives, through the engagement between the truss rack 7-1-1 and gears, the cross slide 7-1-6 to move back and forth along an X-axis, for material conveying between stations. The Z-axis servo motor 7-1-4 drives, through the engagement between a mechanical arm rack 7-1-5 and a gear at an output end of the worm gear drive 7-1-3, the mechanical arm 7-1-7 to move up and down along the Z-axis, for picking and placing materials on the station. A limiting screw 7-1-2 is provided at two ends of the truss 7-5, for limiting a distance by which the cross slide 7-1-6 moves back and forth and cushioning and stopping movement of the cross slide 7-1-6. The rotatable clamping device 7-6 is fixed to a lower end of the mechanical arm 7-1-7, for clamping a workpiece.

Figure 15:
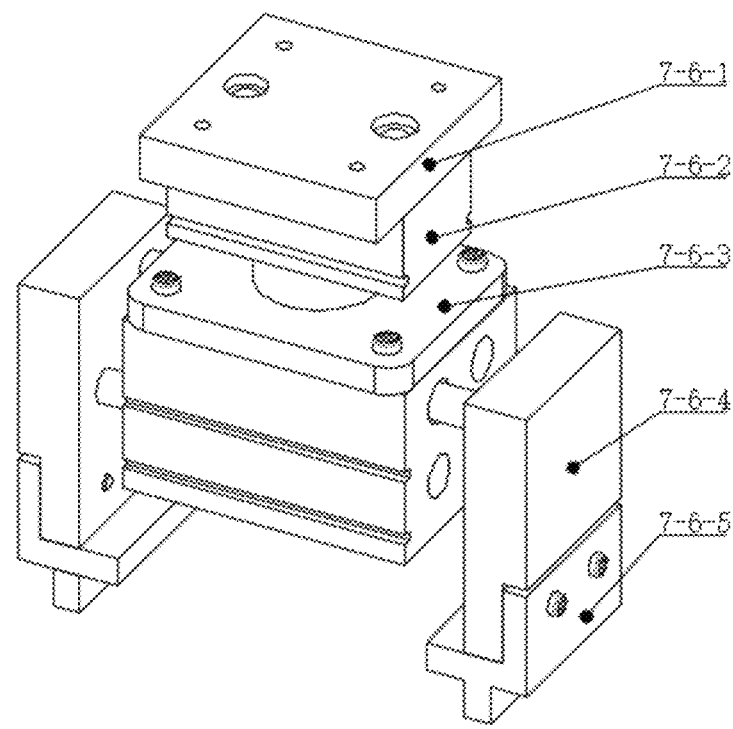
FIG. 15 is a schematic structural diagram of a rotatable clamping device 7-6 in FIG. 13.

Referring to FIG. 15, a cylinder body of a rotatable cylinder 7-6-2 is connected to the mechanical arm through an upper-end connecting plate 7-6-1, a cylinder shaft of the rotatable cylinder 7-6-2 is connected to a parallel gripper 7-6-4 through an intermediate connecting plate 7-6-3, and a clamping plate 7-6-5 is fixed under each jaw on both sides of the parallel gripper 7-6-4, for clamping and pressing a workpiece. The cylinder shaft of the rotatable cylinder 7-6-2 rotates to drive the parallel gripper 7-6-4 below to rotate, to achieve rotation and side change of a clamped workpiece.

Figure 16:
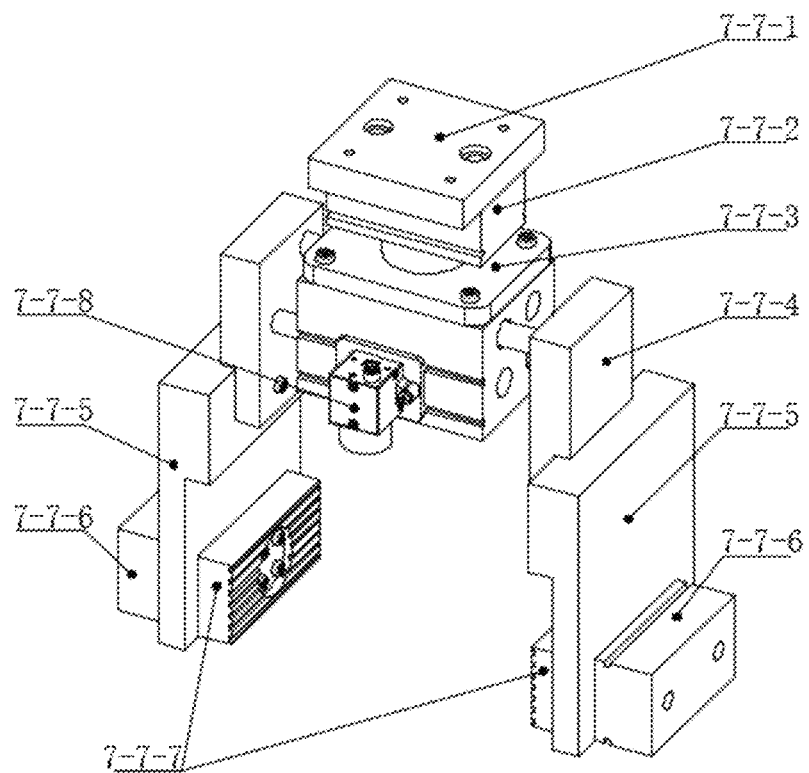
FIG. 16 is a schematic structural diagram of a reversible clamping device 7-7 in FIG. 13.

Referring to FIG. 16, a cylinder fixing plate 7-7-5 is fixed under each jaw on both sides of the parallel gripper 7-7-4, a reversible cylinder 7-7-6 is fixed on each outer side of the cylinder fixing plate 7-7-5, and a cylinder shaft of the reversible cylinder 7-7-6 passes through the cylinder fixing plate 7-7-5 and is connected to a clamping plate 7-7-7. Cylinder shafts on both sides of the reversible cylinder 7-7-6 are driven by a same pneumatic source to rotate, to drive clamping plates 7-7-7 on two sides to rotate at the same time, thereby achieving flipping and face change of a clamped workpiece. An industrial camera I 7-7-8 is fixed to a front side of the parallel gripper 7-7-4 by screws on both sides, for capturing surface quality images of a workpiece at the second station to identify defective products. Other structures and functions of the reversible clamping device 7-7 are the same as those of the rotatable clamping device 7-6.

Figure 17:
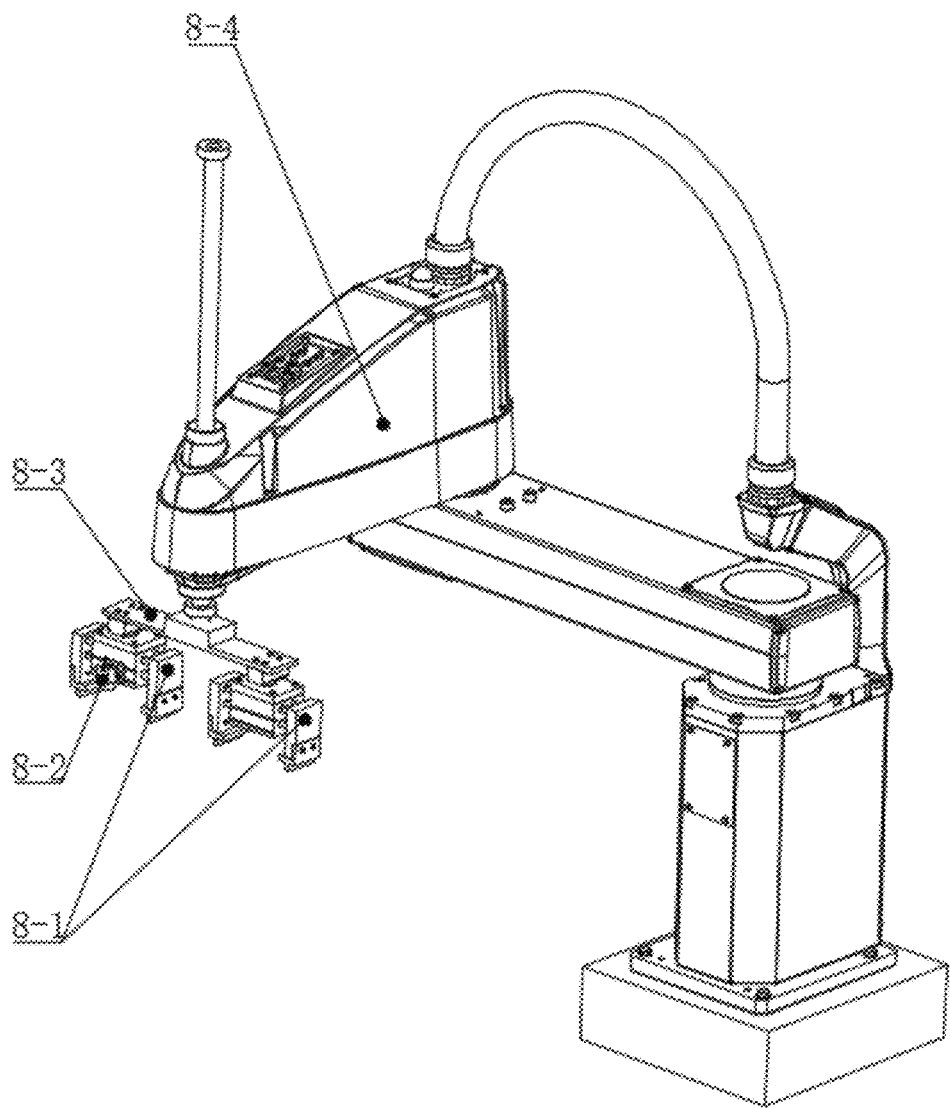
FIG. 17 is a schematic structural diagram of a four-axis two-jaw manipulator 8 in FIG. 2.
Figure 18:
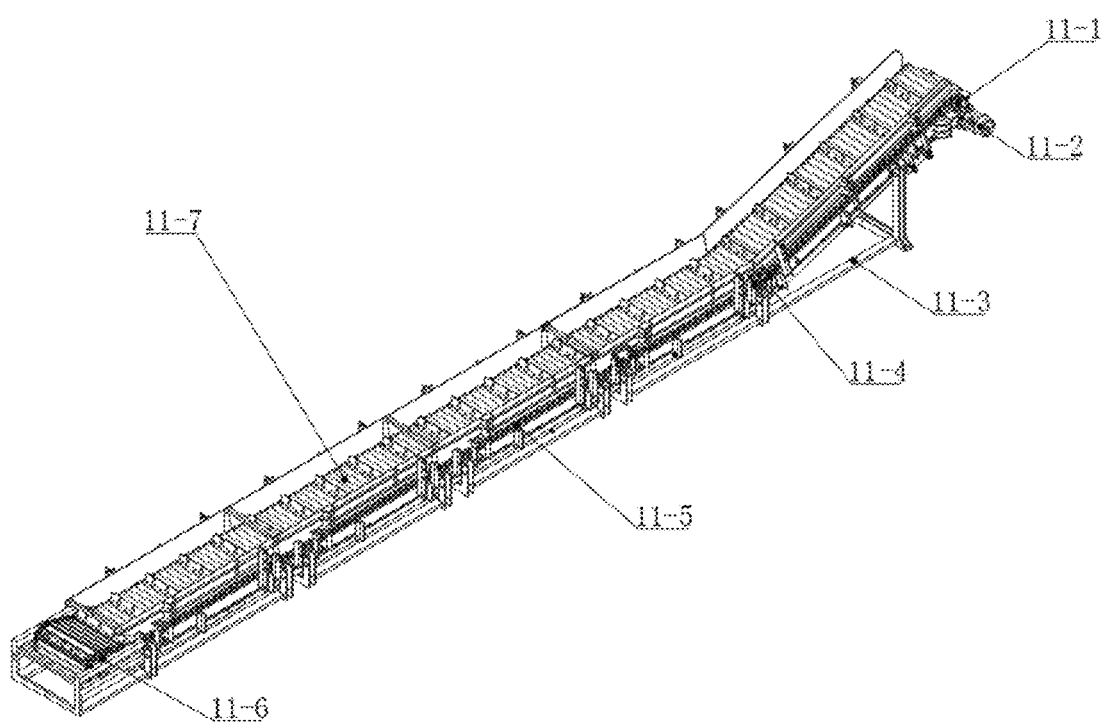
FIG. 18 is a schematic structural diagram of a scrap conveying mechanism 11 in FIG. 2.

Referring to FIG. 17, a connecting plate 8-3 is fixed to a lower end of a screw of a four-axis robot 8-4, and two clamping devices 8-1 are fixed to a lower end of the connecting plate 8-3, for gripping, conveying, and blanking a workpiece. An industrial camera II 8-2 is fixed to a front side of the clamping device 8-1, for capturing workpiece surface quality images of the fourth station, to identify defective products.

The scrap conveying mechanism 11 includes a right end sprocket 11-1, a motor 11-2, a bracket 11-3, a roller 11-4, a chain 11-5, a left end sprocket 11-6, and a scraper conveyor belt 11-7. The bracket 11-3 is arranged underground in an elongated shape, a section on a right side protrudes from the ground in a shape of a slope, the right end sprocket 11-1 is provided at an upper right end, the left end sprocket 11-6 is provided at a left end, and two chains 11-5 surround front and rear sides of the bracket 11-3 and between the sprockets on left and right sides, one scraper conveyor belt 11-7 wraps around the two chains 11-5 in a ring shape, and the roller 11-4 is provided at a turning point of the slope of the bracket 11-3, for limiting the chain 11-5 from ramping up together with a right side of the bracket 11-4. The motor 11-2 fixed to the outer side of the right end sprocket 11-1 at the right end is driven by engagement of the sprocket and the chain, to drive the scraper conveyor belt 11-7 to rotate in a cycle between left and right ends to transport scraps. A scraper is provided above the scraper conveyor belt 11-7 at intervals of a distance to ensure that the scraps do not slide down during climbing of a slope.

Referring to FIG. 1 to FIG. 18, during operation, the intelligent plate parts machining production line combining universal and special equipment described in the present invention specifically completes machining of plate and frame parts according to the following steps:

Step 1: The feeding device 6 includes two disc-type material storage devices 6-2, and ten material boxes 6-2-1 are evenly arranged above each disc-type material storage device 6-2. In an initial position, the ten material boxes on each of the two material storage devices 6-2 are filled with semifinished plate and frame parts in a manner of manual placement of materials. Subsequently, the tray switching device 6-1 starts to work. The stepper motor I 6-1-1 of the tray switching device 6-1 drives the lead screw 6-1-4 to rotate forward, and drives two bases 6-1-3 in threaded fit with the lead screw 6-1-4 to move linearly along the guide rail, to automatically transport a material storage device 6-2 above one of the bases 6-1-3 to directly below the first-station mechanical arm 7-1, and at the same time, move the other material storage device 6-2 to one side. After the two material storage devices 6-2 reach specified positions, the lead screw 6-1-4 fixes the material storage devices 6-2 to the specified positions by self-locking.

Step 2: When the material box directly under the truss conveying device 7 starts feeding, the lifting device 6-3 above starts to work, and the stepper motor III 6-3-7 drives the lead screw 6-3-3 to rotate forward, to drive the slider III 6-3-4 in threaded fit with the lead screw and the bottom plate 6-3-5 fixed to the front side of the slider to ascend along the guide rod 6-3-2, to lift the semifinished parts out of the material box. After the semifinished parts ascend by a fixed height, the ball screw 6-3-3 fixes the semifinished parts to a specified position by self-locking, waiting for grabbing and feeding by the first-station mechanical arm 7-1. After the material box directly under the first-station mechanical arm 7-1 is emptied, the stepper motor III 6-3-7 rotates in a reverse direction, to drive the bottom plate 6-3-5 to descend along the guide rod 6-3-2 until the bottom. At the same time, the stepper motor II 6-2-5 in the material storage device 6-2 drives the rotating disc 6-2-2 to rotate at a particular angle, to allow a next material box to continue feeding.

Step 3: After the material storage device 6-2 directly under the first-station mechanical arm 7-1 is emptied, the tray switching device 6-1 starts to work. The stepper motor I 6-1-1 drives the lead screw 6-1-4 to rotate in a reverse direction, to simultaneously drive the two sliding bases 6-1-3 to move back to the initial positions from the current positions, and then move the emptied material storage device 6-2 to one side, for workers to refill semifinished parts. In addition, the material storage device 6-2 filled with workpieces on the other side is transported to directly below the first-station mechanical arm 7-1, and the operations in step 2 are repeated, to continue feeding.

Step 1, step 2, and step 3 are performed cyclically, to achieve automatic continuous feeding.

Step 4: After a workpiece is lifted to a specified position, the first-station mechanical arm 7-1 starts to work. The X-axis motor on the rear side of the cross slide 7-1-6 rotates forward to drive, through the engagement between a gear provided at the output end of the motor and the truss rack 7-1-1, the cross slide 7-1-6 and the first-station mechanical arm 2-9 to move along the X-axis and approach the material storage device 6-2, until they touch the limiting screw 7-1-2 on the left side and reach a position directly above the material box 6-2-1. The X-axis motor stops, and the Y-axis motor 7-1-4 on the front side of the cross slide 7-1-6 starts to rotate forward to drive, through the engagement between the worm gear drive 7-1-3 and the mechanical arm rack 7-1-5, the first-station mechanical arm 7-1-7 to move down along the Z-axis. After reaching the specified position, the rotatable clamping device 7-6 fixed to the lower end of the mechanical arm 7-1-7 clamps the workpiece through cylinder contraction. The Y-axis motor 7-1-4 starts to rotate in a reversed direction to drive the workpiece to ascend by a particular distance, and then the Y-axis motor 7-1-4 stops. The X-axis motor starts to rotate in a reversed direction to drive the cross slide 7-1-6 and the mechanical arm 7-1-7 to move along the X-axis in a direction approaching the first-station large surface milling machine 1, until they touch the limiting screw 7-1-2 on the right side and reach a position directly above the interchangeable flexible clamp 1-3 of the first station. The X-axis motor stops, and the Y-axis motor 7-1-4 starts to rotate forward to drive the mechanical arm 7-1-7 to move down along the Z-axis until the workpiece is placed on the clamp 1-3 and clamped, and then the Y-axis motor 7-1-4 rotates in the reversed direction again to drive the mechanical arm 7-1-7 to ascend along the Z-axis, to convey a next workpiece, and so on, until the workpieces are all conveyed.

Step 5: The clamping device 7-6 remains a clamping state after placing a workpiece on the clamp 1-3 of the first station, and presses the workpiece by using the clamping plate 7-6-5. After the clamp 1-3-1 clamps the workpiece through the cylinder 1-3-1, the clamping device 7-6 is completely released, and rises away from the workpiece with the mechanical arm 7-1-7. After the workpiece is completely clamped, the pneumatic slide 1-3-6 under the clamp 1-3 starts to work, and for different workpiece widths, moves the workpiece to below a corresponding milling cutter along a vertical direction of the bed 1-1 through movement of the internal cylinder. After the workpiece moves to the specified position, the servo motor inside the bed I 1-1 of the first station starts to rotate forward to drive the clamp 1-3 and the workpiece above to move forward fast along the bed I 1-1 and reduce a working feed speed when they approach the vertical spindle 1-4. In addition, the three-phase asynchronous motor 1-4-3 drives, through belt drive, the vertical spindle 1-4-5 to perform a rotation motion and in turn drive the milling cutter fixed to the lower end of the primary shaft 1-4-5 to perform a cutting motion, thereby milling the upper surface of the workpiece moving over. After the clamp 1-3 and the workpiece are driven by the servo motor to leave the primary shaft 1-4 and reach the end of the bed 1-1, milling and machining are completed, the servo motor stops, and the cylinder 1-3-1 is released. After the second-station mechanical arm 7-2 takes away the workpiece, the servo motor rotates in the reversed direction at a high speed to drive the clamp 1-3 to return quickly to clamp a next workpiece, and so on, until all workpieces are machined.

Step 6: After a workpiece is machined in the first station, the second-station mechanical arm 7-2 hovering above starts to move down along the Z-axis. The industrial camera I 7-7-8 fixed to the front side of the reversible clamping device 7-7 quickly captures images of a surface of the workpiece. An identification system is used to determine whether the surface quality meets a requirement. If the surface quality does not meet the requirement, the system controls the second-station mechanical arm 7-2 and the reversible clamping device 7-7 to throw the workpiece into the waste box 9 between the first station and the second station. If the quality meets the requirement, the system moves the workpiece from the first-station large surface milling machine 1 to the second-station side milling machine 2 by using a method that is the same as that in step 4. At the same time, the reversible clamping device 7-7 mounted at the lower end of the second-station mechanical arm 7-2 starts to work. The reversible cylinder 7-7-6 uses compressed air to drive the output shaft and the clamping plate 7-7-7 fixed to the output shaft to rotate by 180°, thereby driving the clamped workpiece to flip by 180°, thus ensuring that a workpiece positioning plane is a machined smooth plane during machining in a next first station.

Step 7: Referring to step 5, the same working method as the first station is used. After the workpiece is clamped by the clamp on the second-station side milling machine 2, the servo motor drives the workpiece to move forward, and the horizontal milling machines 2-4 on the two sides complete milling and machining of two side faces of the workpiece. After the machining is completed, the third-station mechanical arm 7-3 takes away the workpiece.

Step 8: Referring to step 4, the third-station mechanical arm 7-3 conveys the workpiece from the second station to the third station by using the same working method as the first-station mechanical arm 7-1. In addition, the rotatable clamping device 7-6 mounted at the lower end of the third-station mechanical arm 7-3 starts to work. The rotatable cylinder 7-6-2 uses compressed air to drive the output shaft and the parallel gripper 7-6-4 fixed to the lower end of the output shaft to rotate by 90°, and in turn drives the clamped workpiece to rotate by 90°, such that the next station machines the other two side faces of the workpiece.

Step 9: Referring to step 7, the same working method as the second station is used. After the workpiece is clamped by the clamp on the third-station side chamfering milling machine 3, the servo motor drives the workpiece to move forward. The first two horizontal milling machines 3-4 complete machining and milling of the other two side faces of the workpiece, and the last two horizontal milling machines 3-4 complete milling and machining of chamfers on the same side. After the machining is completed, the fourth-station mechanical arm 7-4 takes away the workpiece.

Step 10: Referring to step 4, the fourth-station mechanical arm 7-4 conveys the workpiece from the third station to the fourth station by using the same working method as the first-station mechanical arm 7-1.

Step 11: Referring to step 5, the same working method as the first station is used. The fourth-station large surface milling machine 4 completes milling and machining of the upper surface of the workpiece after flipping.

Step 12: After the workpiece is machined in the fourth station, the four-axis two-jaw manipulator 8 starts to work. Two clamping devices 8-1 are fixed to the lower end of the four-axis two-claw manipulator 8 by the connecting plate 8-3. An industrial camera II 8-2 on a front side of one of the clamping devices 8-1 quickly captures images of a surface of the workpiece. An identification system is used to determine whether the surface quality meets a requirement. If the surface quality does not meet the requirement, the system controls the four-axis two-claw manipulator 8 to throw the workpiece into the waste box 9 between the fourth and fifth stations. If the quality meets the requirement, the system controls the foregoing mechanism to convey the workpiece to the front of the fifth-station computer numerical control universal machining center 5. In this case, another clamping device 8-1 takes away finished products that have gone through all processes of machining on the computer numerical control universal machining center machining center 5, and then place the workpiece conveyed from the fourth station on the computer numerical control universal machining center 5 to complete the remaining processes of machining. At the same time, another clamping device 8-1 conveys, to the discharging box 10, the finished products taken away from the computer numerical control universal machining center 5. After blanking is completed, the clamping device 8-1 returns to the fourth station, and waits for gripping of a next workpiece, and so on, to complete the continuous cycle of conveying and blanking.

The scrap conveying mechanism 11 is buried in the ground and provided under the entire production line. When the first-station large surface milling machine starts to work, the scrap conveying mechanism 11 already starts to work, and the motor provided on the end is driven by the sprocket and the chain, to drive the scraper to transport, to the rear side of the computer numerical control universal machining center 5, scraps that fall into the groove, and uniformly discharge the scraps into the waste box, to complete the transportation and collection of scraps of the entire production line.

Although the embodiments of the present invention have been shown and described, those of ordinary skill in the art can understand that various changes, modifications, replacements, and variants may be made to these embodiments without departing from the principle and spirit of the present invention, and the scope of the present invention is subject to the appended claims and their equivalents.

What is claimed is:

1. A machining production line for machining plate parts, the machining production line comprising:
    a first-station surface milling machine, a second-station milling machine, a third-station chamfering milling machine, a fourth-station surface milling machine, a fifth-station computer numerical control universal machining center, an automatic feeding device, a truss conveying device, a four-axis two-jaw manipulator, a first waste box, a second waste box, a discharging box, a scrap conveying mechanism, and a controller, wherein
    the production line is arranged in a shape of a square, the automatic feeding device thereof comprises two feeding bodies, longitudinally arranged and placed at a beginning of the production line, a scrap outlet of the scrap conveying mechanism is placed at an end of the production line, and the first-station surface milling machine, the second-station milling machine, the third-station chamfering milling machine, the fourth-station surface milling machine, and the fifth-station computer numerical control universal machining center are placed in a linear sequence between the beginning and the end of the production line;
    the truss conveying device is arranged in parallel with the linear sequence so as to be disposed behind the linear sequence, and the truss conveying device is correspondingly provided with each of a first-station mechanical arm, a second-station mechanical arm, a third-station mechanical arm, and a fourth-station mechanical arm;
    the four-axis two-jaw manipulator is provided between the fourth-station surface milling machine and the fifth-station computer numerical control universal machining center;
    the first waste box, which is for storing defective products, is provided between the first-station surface milling machine and the second-station milling machine, and the second waste box, which is for storing defective products, is provided between the fourth-station surface milling machine and the fifth-station computer numerical control universal machining center;
    the discharging box, which is for storing finished products, is provided to a side of the fifth-station computer numerical control universal machining center; and
    two grooves are provided in parallel on a ground of the production line from the first-station surface milling machine to the fifth-station computer numerical control universal machining center of the production line, the scrap conveying mechanism, which is for transporting scraps, is provided in the two grooves, and the conveying mechanisms is sloped out of the ground at the end of the production line to send the scraps above the ground and into a scrap box;
    the automatic feeding device comprises a tray switching device and two disc-type material storage devices, wherein the tray switching device is of an elongated structure and the two disc-type material storage devices are arranged above the tray switching device side by side, each of the two disc-type material storage devices is annularly provided with ten respective material boxes, and each material box is provided with one respective lifting device;
    the tray switching device transports one of the two disc-type material storage devices to one side through a screw drive and transports the other of the two disc-type material storage devices to below the first-station mechanical arm, the respective lifting device lifts workpieces in a given material box of the other of the two disc-type material storage devices to a specific height in sequence, the first-station mechanical arm takes away the workpieces, and after all the workpieces in the given material box have been taken away, the tray switching device rotates at a particular angle to switch to a next material box; and after the ten material boxes on the other of the two disc-type material storage devices are all emptied, the tray switching device moves the other of the two disc-type material storage devices to one side for workers to fill workpieces therein, and at the same time, the one of the two disc-type material storage devices, which is filled with workpieces, is moved to below the first-station mechanical arm to continue feeding to achieve automatic continuous feeding;

the first-station large surface milling machine comprises a bed I, a machine tool protective cover I, an interchangeable flexible clamp I, and two identical vertical milling machines, wherein the machine tool protective cover I and the interchangeable flexible clamp I are arranged above the bed I, the two identical vertical milling machines are respectively arranged on opposing sides of the bed I, and the two vertical milling machines are staggered by a distance of one workpiece for applying tools during milling of an upper surface of a given workpiece; a screw drive mechanism is provided inside the bed I for driving the interchangeable flexible clamp I to advance and retract; when a workpiece is smaller than a given size, the interchangeable flexible clamp I moves the workpiece to one side of the bed I through a cylinder slide below, and a single one of the two vertical milling machines completes milling and machining of an upper surface of the workpiece; when the workpiece is larger than the given size, the interchangeable flexible clamp I moves the workpiece to a middle of the bed I, and the two vertical milling machines apply the tools successively to complete milling and machining of the upper surface of the workpiece; and the machine tool protective cover I is in a shape of a herringbone for guiding scraps into scrap chutes associated therewith;

the second-station side milling machine comprises a bed II, a machine tool protective cover II, a flexible clamp II, and two identical horizontal milling machines, wherein the machine tool protective cover II and the flexible clamp II are arranged above the bed II, the two identical horizontal milling machines are symmetrically arranged on opposing sides of the bed for milling opposing side faces of a workpiece at the same time; a screw drive mechanism is provided inside the bed II for driving the flexible clamp to advance and retract; and the two horizontal milling machines adjust a distance between two milling cutters thereof through an internal hydraulic slide to implement machining of plate parts with different widths, and the machine tool protective cover II is in a shape of a herringbone for guiding scraps into scrap chutes on two sides of the machine tool associated therewith;

the third-station side chamfering milling machine comprises a bed III, a machine tool protective cover III, a flexible clamp III, and four horizontal milling machines that are symmetrically arranged on two sides of the bed III, wherein two of the four horizontal milling machines, which are arranged closer to the beginning of the production line than the remaining two horizontal milling machines, are mounted with face milling cutters for milling opposing side faces of a workpiece at the same time, and the two remaining horizontal milling machines, which are arranged closer to the end of the production line, are mounted with chamfering milling cutters for milling chamfers on the opposing sides of the workpiece at the same time;

the fourth-station surface milling machine has the same structure as the first-station surface milling machine, and therefore the fourth-station surface milling station functions in a same manner as the first-station surface milling machine;

the truss conveying device comprises the first-station mechanical arm, the second-station mechanical arm, the third-station mechanical arm, the fourth-station mechanical arm, a truss, a rotatable clamping device, a reversible clamping device, and four columns, wherein the truss is fixed to the four columns, and the first-station mechanical arm, the second-station mechanical arm, the third-station mechanical arm, and the fourth-station mechanical arm are placed in a linear sequence on a front side of the truss; and each mechanical arm is driven by a respective motor to move in a horizontal direction and a vertical direction on the truss to convey a workpiece between the first-station surface milling machine and the fourth-station surface milling station, wherein the rotatable clamping device is fixed under the first, third, and fourth-station mechanical arms for rotating the workpiece by 90 degrees during conveying to achieve a side change of the workpiece; and the reversible clamping device is fixed below the second-station mechanical arm for flipping the workpiece by 180 degrees during the conveying to achieve a face change of the workpiece;

the four-axis two-claw manipulator comprises a clamping device, an industrial camera II, a connecting plate, and a four-axis robot, wherein the connecting plate is fixed to a lower end of a screw of the four-axis robot, and two clamping devices are fixed to a lower end of the connecting plate for gripping, conveying, and blanking a workpiece; the industrial camera II is fixed to a first side of the clamping device for capturing workpiece surface quality images of the fourth-station surface milling station so as to identify defective products; and the scrap conveying mechanism comprises a right end sprocket, a motor, a bracket, a roller, a chain, a left end sprocket, and a scraper conveyor belt, wherein the bracket is arranged in an underground groove in an elongated shape, a section of the bracket on a right side protrudes from the ground in a shape of a slope, the right end sprocket is provided at an upper right end, the left end sprocket is provided at a left end, and two chains surround front and rear sides of the bracket and between the sprockets on left and right sides, one scraper conveyor belt wraps around the two chains in a ring shape, and the roller is provided at a turning point of the slope of the bracket for limiting the chain from ramping up together with a right side of the bracket; and the motor that is fixed to an outer side of the right end sprocket at the right end is driven by engagement of the sprocket and the chain to drive the scraper conveyor belt to rotate in a cycle between left and right ends to transport scraps; and a scraper is provided above the scraper conveyor belt at intervals of a distance to ensure that the scraps do not slide down during climbing of a slope on the scraper conveyor belt.

2. The machining production line according to claim 1, wherein the tray switching device comprises: a stepper motor I, a motor drive base, two identical sliding bases, a ball screw, a slider I, a bearing seat, a screw nut, a linear guide, and an outer base, wherein the motor drive base and the stepper motor I are fixed to a left end of the outer base, the bearing seat is fixed to a right end of the outer base, and the ball screw is connected to a middle of the outer base, two linear guides are arranged in parallel on two sides, and the two identical sliding bases are arranged above the outer base for carrying the two disc-type material storage devices; and four sliders I and one screw nut are fixed under the sliding base, the slider I is slidable on the linear guide, the screw nut is in threaded fit with the ball screw and is driven by the stepper motor I to move back and forth on the ball screw to in turn drive the two identical sliding bases to move back and forth on the outer base, and the two identical sliding bases are mounted on a same lead screw and are driven by the stepper motor I to achieve synchronous switching of an empty tray and a feeding tray.

3. The machining production line according to claim 1, wherein each of the two disc-type material storage devices respectively comprises: the lifting device, a pound-sign-type material box, a rotating disc, a flange plate, a motor fixing base plate, a stepper motor II, a base bracket, and a base connecting plate, wherein multiple holes are equally formed in the rotating disc along a circumference thereof, and the pound-sign-type material box comprises four L-shaped steel frames and is fixed to the rotating disc through the holes, wherein two steel frames on the outer side can be fixed in different holes to adjust a size of the pound-sign-type material box, thereby achieving storage of workpieces of different sizes;

the stepper motor II is connected to the rotating disc through the flange plate, and drives the rotating disc to rotate around a central axis at particular intervals at a particular angle, to achieve switching of the pound-sign-type material box fixed above the rotating disc; and the motor fixing base plate fixes the stepper motor II to the base bracket, and the base bracket is fixed to the tray switching device by the base connecting plate.

4. The machining production line according to claim 1, wherein each lifting device respectively comprises: an external frame, a guide rod, a ball screw, a slider III, a bottom plate, a connecting plate, and a stepper motor III, wherein the stepper motor III is fixed to a lower side of a rotating disc through the connecting plate, the external frame is fixed to an upper side of the rotating disc, two guide rods are provided inside the external frame, the slider III is slidable on the two guide rods, and the stepper motor III drives, through threaded engagement between the ball screw and the slider III, the bottom plate at a front end of the slider III to move up and down to achieve lifting and lowering of a workpiece.

5. The machining production line according to claim 1, wherein the interchangeable flexible clamp comprises: two cylinders, a clamp, a positioning plane, a stopper, a clamp base, four pneumatic slides, and a slide base, wherein the four pneumatic slides are fixed above the slide base, the clamp base is fixed above the four pneumatic slides, the positioning plane is fixed to a middle of the clamp base for placing a workpiece, the stopper is fixed to a right side of the clamp base, the two cylinders are fixed to a left side of the clamp base, and the clamp is fixed to the two cylinders for clamping the workpiece; and the four pneumatic slides can slide back and forth to drive the clamp base above to move back and forth on the slide base to change a clamp machining position.

6. The machining production line according to claim 1, wherein each of the two vertical milling machines respectively comprises: a base, a sliding table, a motor, a belt, a vertical spindle, and a lead screw, wherein the lead screw driven by hydraulic pressure is provided inside the base, the sliding table is provided on a front side of the base, the vertical spindle is provided on a front side of the sliding table, and the motor is provided on a rear side of the sliding table;

the motor drives, through the belt, the vertical spindle to perform a rotation motion to drive the tool associated therewith below to perform a cutting motion; and the sliding table is in threaded fit with the lead screw, and therefore can slide up and down on a sliding track on the front side of the base, thereby changing a machining height of the vertical spindle, to achieve machining of plate parts with different thicknesses.

7. The machining production line according to claim 1, wherein the first-station mechanical arm comprises: one of the four columns, the truss, a truss rack, two limiting screws, a worm gear drive, a Z-axis servo motor, a mechanical arm rack, a cross slide, a mechanical arm, and the rotatable clamping device, wherein the truss is horizontally fixed to the one of the four columns, the truss rack is fixed to an upper side of the truss, the cross slide is mounted on a front side of the truss, an X-axis servo motor is mounted on a rear side of the cross slide, the mechanical arm is provided on a front side of the cross slide along a Z-axis, the worm gear drive is mounted on a left side of the cross slide, and an input end above the worm gear drive is connected to an output end of the Z-axis servo motor; an output end of the X-axis servo motor drives, through the engagement between the truss rack and gears, the cross slide to move back and forth along an X-axis for material conveying between stations;

the Z-axis servo motor drives, through the engagement between the mechanical arm rack and a gear at an output end of the worm gear drive, the mechanical arm to move up and down along the Z-axis for picking and placing materials on the first-station surface milling machine;

the two limiting screws are provided at two ends of the truss for limiting a distance by which the cross slide moves back and forth and cushioning and stopping movement of the cross slide; and the rotatable clamping device is fixed to a lower end of the mechanical arm for clamping a workpiece.

8. The machining production line according to claim 1, wherein the reversible clamping device is fixed to a lower end of the second-station mechanical arm; and the third-station mechanical arm and the fourth-station mechanical arm have the same structure as the first-station mechanical arm, and thus the third-station mechanical arm and the fourth-station mechanical arm function in a same manner as the first-station mechanical arm.

9. The machining production line according to claim 1, wherein
the rotatable clamping device comprises: an upper-end connecting plate, a rotatable cylinder, an intermediate connecting plate, two parallel grippers, and two clamping plates, wherein
a cylinder body of the rotatable cylinder is connected to the associated mechanical arm through the upper-end connecting plate, a cylinder shaft of the rotatable cylinder is connected to the two parallel grippers through the intermediate connecting plate, and one clamping plate is fixed under each jaw for clamping and pressing a workpiece; and
the cylinder shaft of the rotatable cylinder rotates to drive the two parallel grippers below to rotate to achieve the side change of a clamped workpiece.

10. The machining production line according to claim 1, wherein
the reversible clamping device comprises: an upper-end connecting plate, a rotatable cylinder, an intermediate connecting plate, two parallel grippers, two cylinder fixing plates, two reversible cylinders, two clamping plates, and an industrial camera I, wherein
one of the two cylinder fixing plates is fixed under each jaw, a respective reversible cylinder is fixed on an outer side of each of the two cylinder fixing plates, and a cylinder shaft of each reversible cylinder passes through the associated cylinder fixing plate and is connected to the corresponding clamping plate;
cylinder shafts on each of the two reversible cylinders are driven by a same pneumatic source to rotate, to drive the two clamping plates to rotate at a same time, thereby achieving flipping and face change of a clamped workpiece; and
the industrial camera I is fixed to a front side of the two parallel grippers by screws for capturing surface quality images of a workpiece at the second station milling machine to identify defective products.

\* \* \* \* \*